United States Patent
Halpin et al.

(10) Patent No.: US 10,679,518 B2
(45) Date of Patent: Jun. 9, 2020

(54) REPLICATING EFFECTS OF OPTICAL LENSES

(71) Applicant: HALGO PTY LIMITED, Randwick (AU)

(72) Inventors: Melanie Halpin, Randwick (AU); Anthony Miller, Randwick (AU)

(73) Assignee: HALGO PTY LIMITED, Randwick (AU)

( * ) Notice: Subject to any disclaimer, the term of this patent is extended or adjusted under 35 U.S.C. 154(b) by 0 days.

(21) Appl. No.: 15/536,638

(22) PCT Filed: Dec. 18, 2015

(86) PCT No.: PCT/AU2015/050816
§ 371 (c)(1),
(2) Date: Jun. 16, 2017

(87) PCT Pub. No.: WO2016/094963
PCT Pub. Date: Jun. 23, 2016

(65) Prior Publication Data
US 2017/0365189 A1    Dec. 21, 2017

(30) Foreign Application Priority Data
Dec. 18, 2014    (WO) ................ PCT/AU2014/050436

(51) Int. Cl.
*G09B 21/00*    (2006.01)
*G06F 3/048*    (2013.01)

(52) U.S. Cl.
CPC .......... *G09B 21/008* (2013.01); *G06F 3/048* (2013.01); *G09G 2320/028* (2013.01);
(Continued)

(58) Field of Classification Search
CPC .............. G09B 21/008; G06F 3/048; G09G 2320/028; G09G 2330/04; G09G 2358/00; G09G 2354/00
See application file for complete search history.

(56) References Cited

U.S. PATENT DOCUMENTS

2012/0001932 A1    1/2012 Burnett et al.
2012/0262477 A1   10/2012 Buchheit
(Continued)

FOREIGN PATENT DOCUMENTS

WO        2011133945 A1   10/2011
WO     WO2013/001932 A1    1/2013

OTHER PUBLICATIONS

International Search Report received in PCT/AU2015/050816, dated Mar. 10, 2016 5 pages.
(Continued)

*Primary Examiner* — Qian Yang
(74) *Attorney, Agent, or Firm* — Procopio, Cory, Gargreaves & Savitch LLP; Noel C. Gillespie

(57) ABSTRACT

This disclosure relates to an electronic device for compensating for a visual impairment. The electronic device comprises a display to display a graphical user interface to a user and an input port to receive a request for modifying the graphical user interface to compensate for a visual impairment of the user. The device further comprises a processor to modify the graphical user interface to compensate for a visual impairment of the user by replicating an optical effect of one or more optical lenses. A visually impaired user can operate the device because the processor modifies the interface to compensate for the visual impairment. Without the modification of the interface, it would be difficult for the user to operate the device because the visual impairment causes the interface to appear blurred.

17 Claims, 20 Drawing Sheets

(52) U.S. Cl.
CPC ..... *G09G 2330/04* (2013.01); *G09G 2354/00* (2013.01); *G09G 2358/00* (2013.01)

(56) References Cited

U.S. PATENT DOCUMENTS

| | | | |
|---|---|---|---|
| 2013/0027668 A1* | 1/2013 | Pamplona | A61B 3/032 |
| | | | 351/239 |
| 2013/0120390 A1 | 5/2013 | Marchand et al. | |
| 2014/0168034 A1 | 6/2014 | Luebke et al. | |
| 2015/0084939 A1* | 3/2015 | Chen | G09G 3/3607 |
| | | | 345/204 |

OTHER PUBLICATIONS

International Written Opinion received in PCT/AU2015/050816, dated Mar. 10, 2016, 4 pages.
Pamplona, et al. "Tailored Displays to Compensate for Visual Aberrations," BNSDOCID: <XP_55257464A_I_>, 12 pages.
Extended European Search Report in European Application No. 15868718.6 dated Apr. 23, 2018, 9 pages.

\* cited by examiner

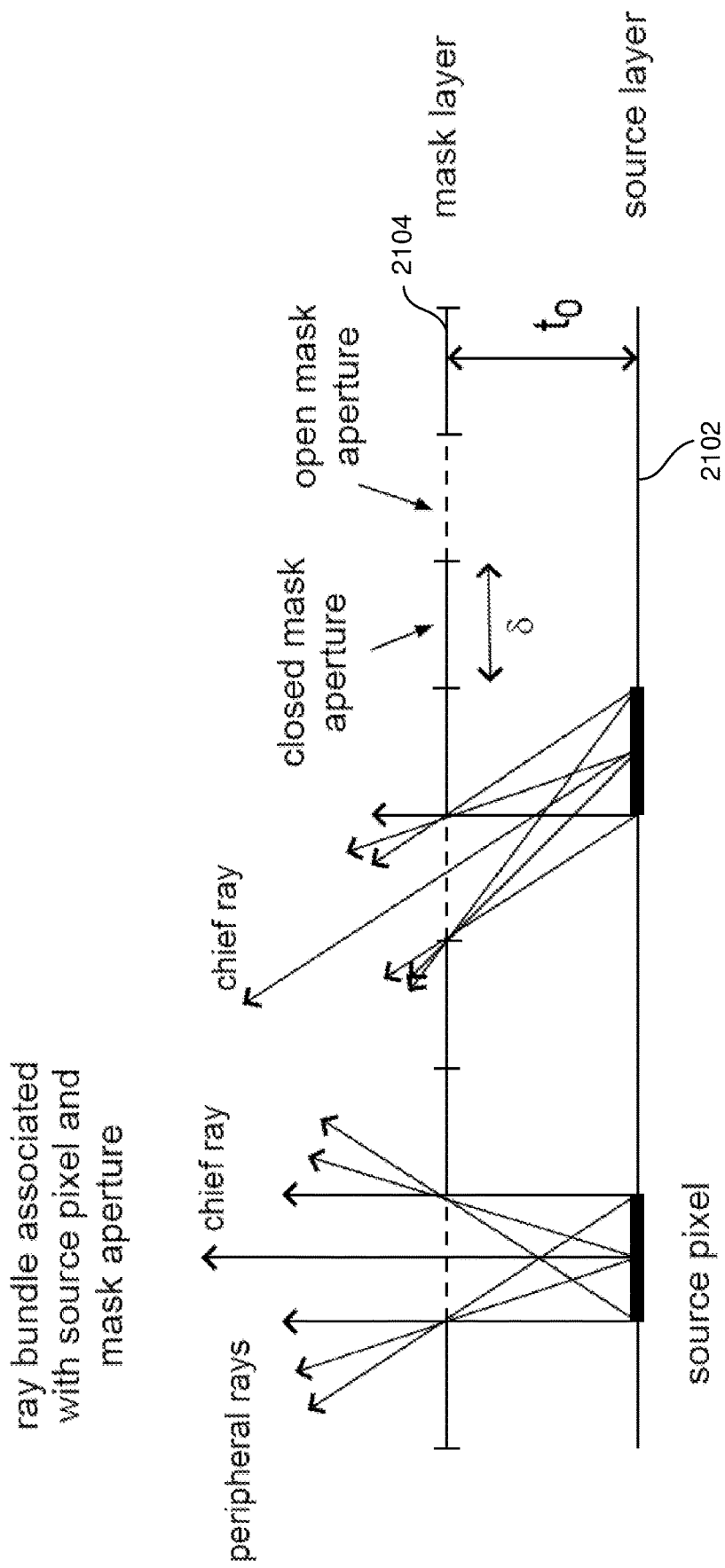

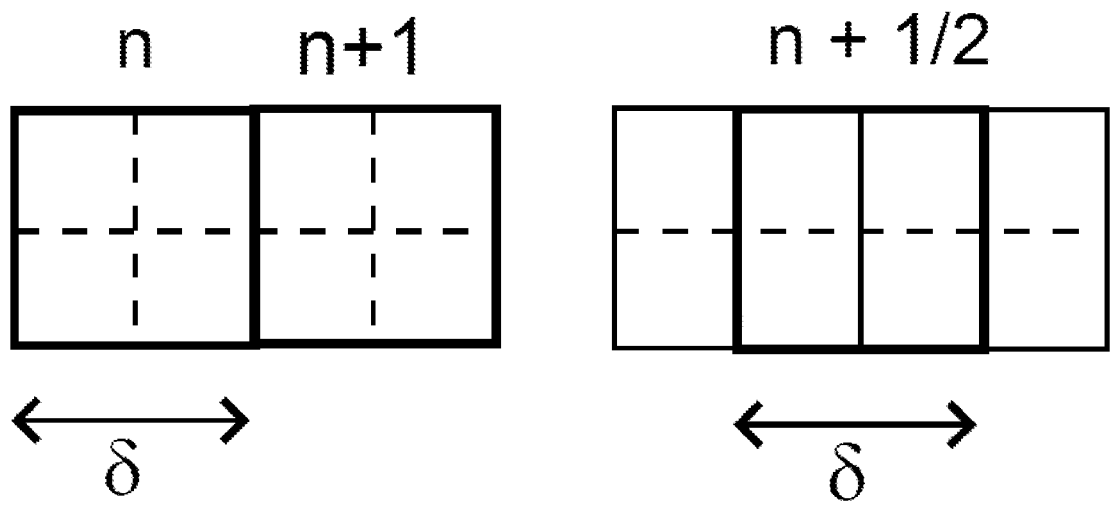
Fig. 22a
Fig. 22b
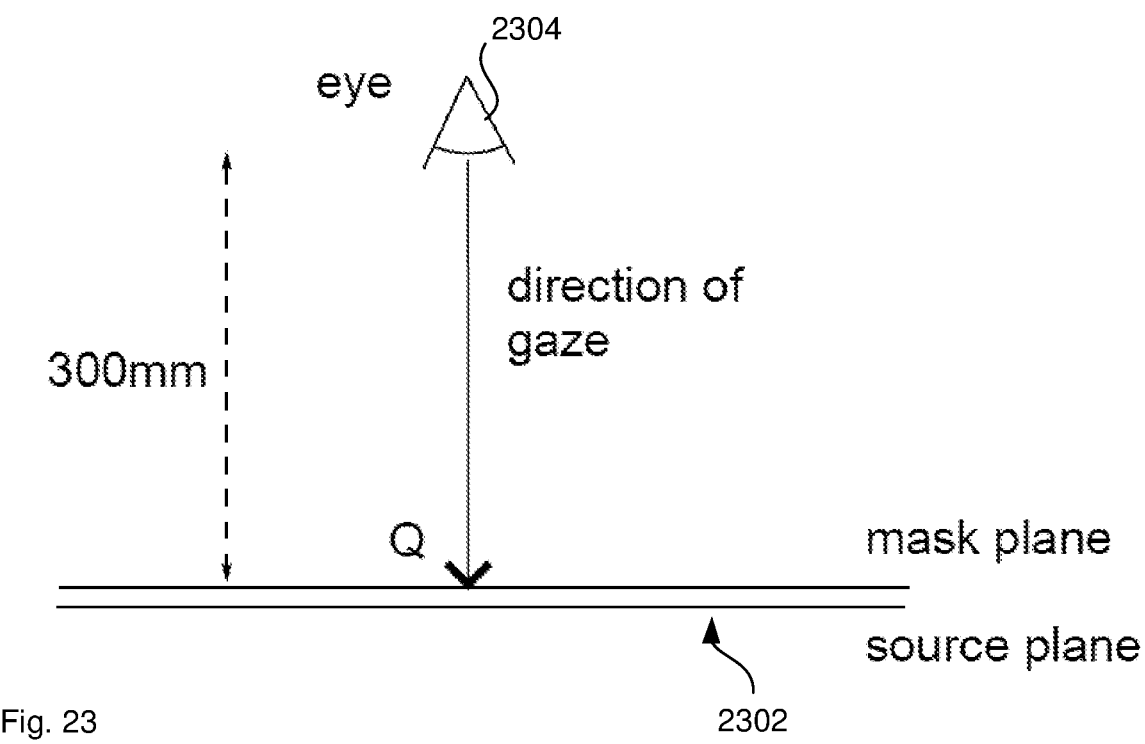
Fig. 23

REPLICATING EFFECTS OF OPTICAL LENSES

TECHNICAL FIELD

This disclosure relates to modifying a graphical user interface to compensate for a visual impairment.

BACKGROUND ART

In conventional visual display devices a pixel corresponds to a LED, LCD or other small component which emits light, either directly or indirectly. These will usually emit light in a broad spread of directions. The intensity of emitted light typically peaks in the straight ahead, or normal direction and gradually falls off as the angle moves away from the straight ahead direction. Typically, the light intensity is within 75% of its straight ahead direction over a range of ±25 degrees.

This spread of ray directions, whilst useful for giving a large field of viewing directions, is undesirable in cases where the viewing distance of the display is outside the uncorrected visual range of the user.

FIG. 1 illustrates an example 100 of a presbyopic user where a display 102 is closer than the user's uncorrected near point. In this example, the distance 103 between the eye and the display is about 300 mm. This will result in a blurred image for the user as the refractive power of their eye 104 is insufficient to sharply focus the image of a pixel on their retina 106. Light from pixel P 108 on the display 102 is emitted in a spread of directions and impinges upon the front surface 110 of the eye 104 of the user within the pupil aperture of about 4 mm diameter, for example. If the display 102 is closer than the visual near point of the user, then the user's eyes cannot refract the light sufficiently, and blurring will occur, which is indicated by blur spot 112 as opposed to a single point on retina 112.

Of course, the user can always wear spectacles, contact lenses or other personal refractive correction solutions; however, this may not always be convenient.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

An electronic device comprises:
a display to display a graphical user interface to a user;
an input port to receive a request for modifying the graphical user interface to compensate for a visual impairment of the user; and
a processor to modify the graphical user interface to compensate for a visual impairment of the user by replicating an optical effect of one or more optical lenses.

It is an advantage that a visually impaired user can operate the device because the processor modifies the interface to compensate for the visual impairment. Without the modification of the interface, it would be difficult for the user to operate the device because the visual impairment causes the interface to appear blurred.

The optical effect of one or more optical lenses may be the optical effect of one or more prescription lenses.

The processor may be to generate a display to allow the user to select one or more of multiple candidate optical lenses and the optical effect may be the optical effect of the selected one or more candidate optical lenses.

The processor may be to generate a display allowing the user to provide user credentials to access a user account associated with the user and associated with the one or more optical lenses.

The processor may be to execute one or more functions of an operating system installed on the electronic device to modify the graphical user interface.

The display may comprise a source layer including multiple active light sources and one or more mask layers including multiple transmission control elements.

The processor may be to determine a control signal to control the source layer and the one or more mask layers to replicate the optical effect of one or more optical lenses.

A method for displaying a graphical user interface on a display to a user comprises:
receiving a request for modifying the graphical user interface to compensate for a visual impairment of the user; and
modifying the graphical user interface to compensate for a visual impairment of the user by replicating an optical effect of one or more optical lenses.

Modifying the graphical user interface may comprise determining a control signal to control a source layer of the display and one or more mask layers of the display to replicate the optical effect of one or more optical lenses.

The method may further comprise receiving sensor data indicative of an eye measurement of the user, wherein determining the control signal comprises determining the control signal to replicate the optical effect of one or more optical lenses in relation to an area of the display identified by the eye measurement.

The eye measurement may comprise for each eye one or more of:
the direction of gaze;
the fixation point of the eye on a extended object that is being viewed;
the location of the centre of the pupil; and
the pupil size.

Determining the control signal may comprise optimising a cost function that is based on the control signal.

The cost function may be representative of an amount of blurring perceived by the user and may be based on a pupil focal error.

Optimising the cost function may comprise receiving pre-computed data associated with the eye gaze direction of the user.

Optimising the cost function may comprise solving a linear problem, and receiving pre-computed data associated with the eye gaze direction of the user may comprise receiving data indicative of a singular value decomposition of the linear problem for the eye gaze direction of the user.

Solving a linear problem may comprise solving linear problem that is an approximation of a non-linear problem, such as a quadratic problem.

Receiving pre-computed data may comprise receiving the pre-computed data from internal or external data memory or from a data server over a data network connection.

Determining the control signal may comprise determining the control signal for each of multiple subsets of pixels of the interface.

Determining the control signal may comprise determining the control signal such that the multiple subsets of pixels are displayed consecutively. Pixels within a predetermined pattern may belong to the same subset.

Determining the control signal may comprise optimising a cost function that is based on the predetermined pattern.

The multiple subsets may be disjoint such that there is no overlap between subsets.

The predetermined pattern may be defined by a predetermined distance such that pixels within the predetermined distance belong to different subsets.

Determining the control signal may comprise determining a projection of source pixels on to a conjugate plane to the retina; and minimising an overlap of the projection of one subset with the projection of any other subset on the conjugate plane.

Software when installed on a computer causes the computer to perform the method above and may be integrated into an operating system installed on the computer.

Optional features described of any aspect of method, computer readable medium or computer system, where appropriate, similarly apply to the other aspects also described here.

An example will be described with reference to

Figure 2:
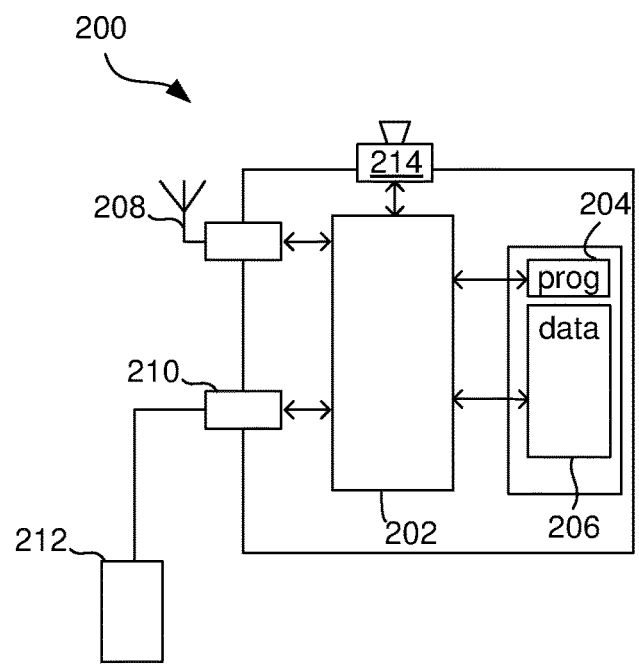

FIG. 2 illustrates a computer system, for displaying a graphical user interface.

Figure 3:
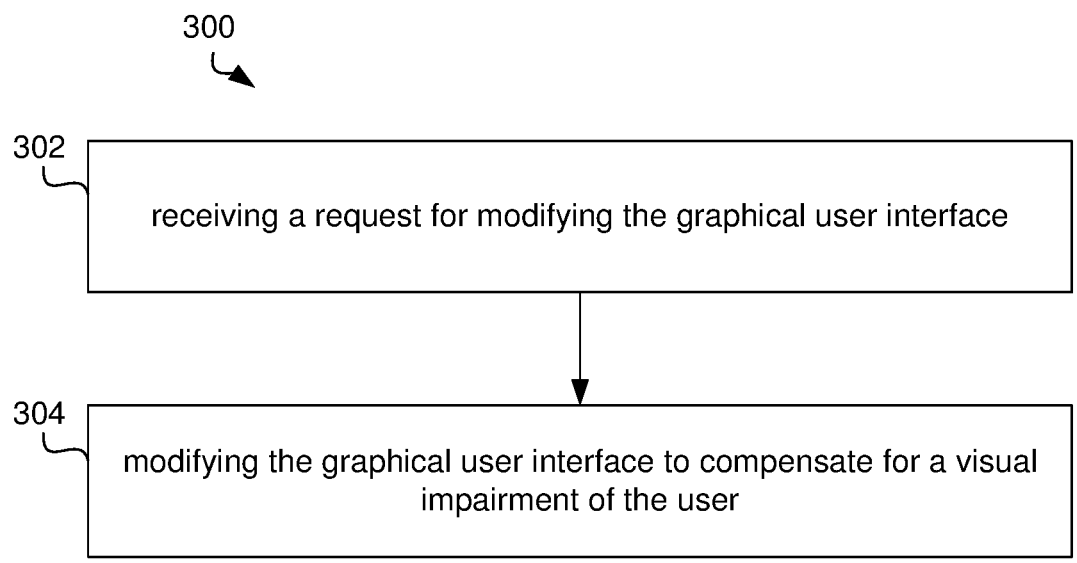

FIG. 3 illustrates a method for displaying a graphical user interface.

Figure 4:
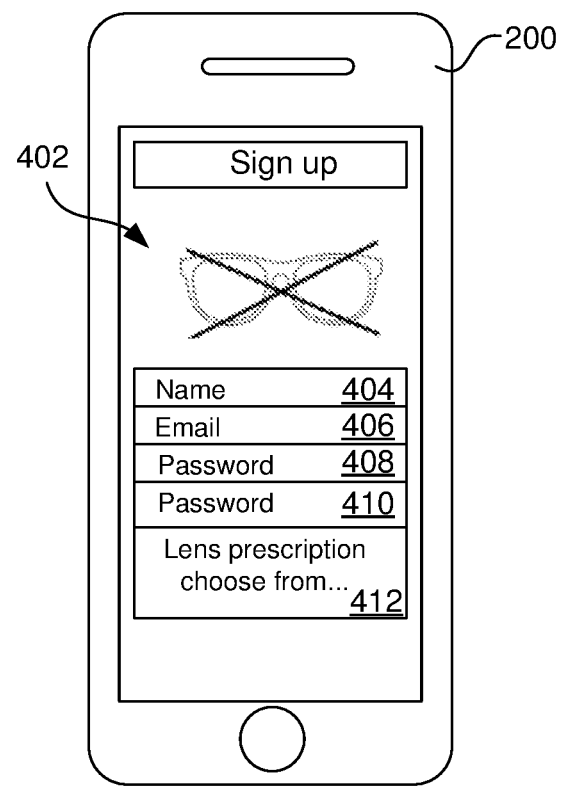

FIG. 4 illustrates a display that allows a user to sign up to a service.

Figure 5:
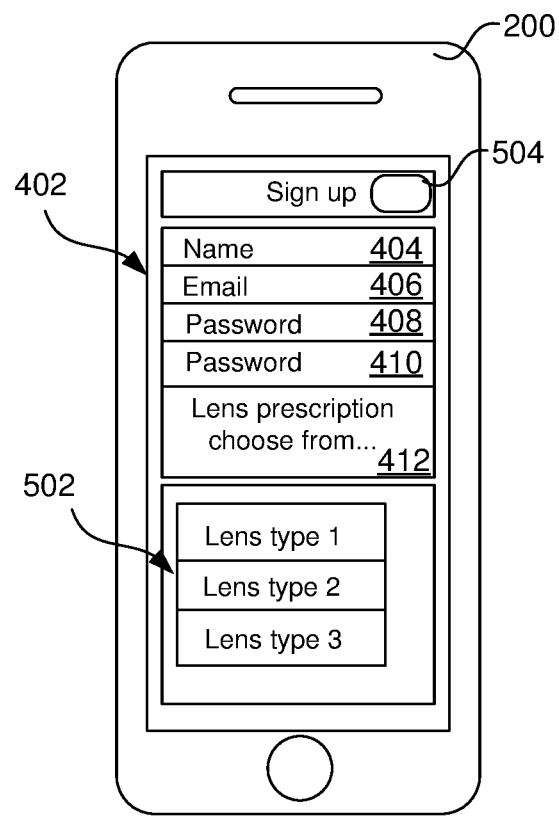

FIG. 5 illustrates the display of FIG. 3 after the user has tapped a lens selection field on the display of FIG. 3.

Figure 6:
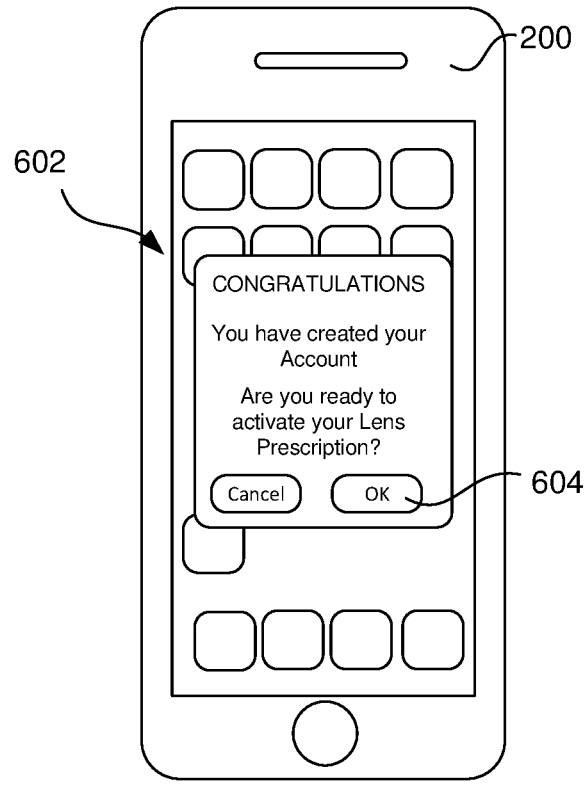

FIG. 6 illustrates a display to allow the user to activate the modification of the graphical user interface.

Figure 7:
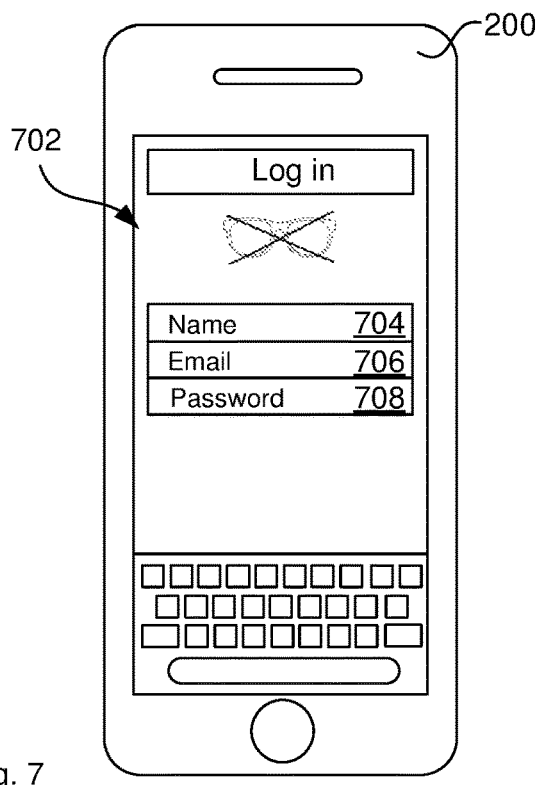

FIG. 7 illustrates a display to allow the user to provide previously defined user credentials.

Figures 8A, 8B:
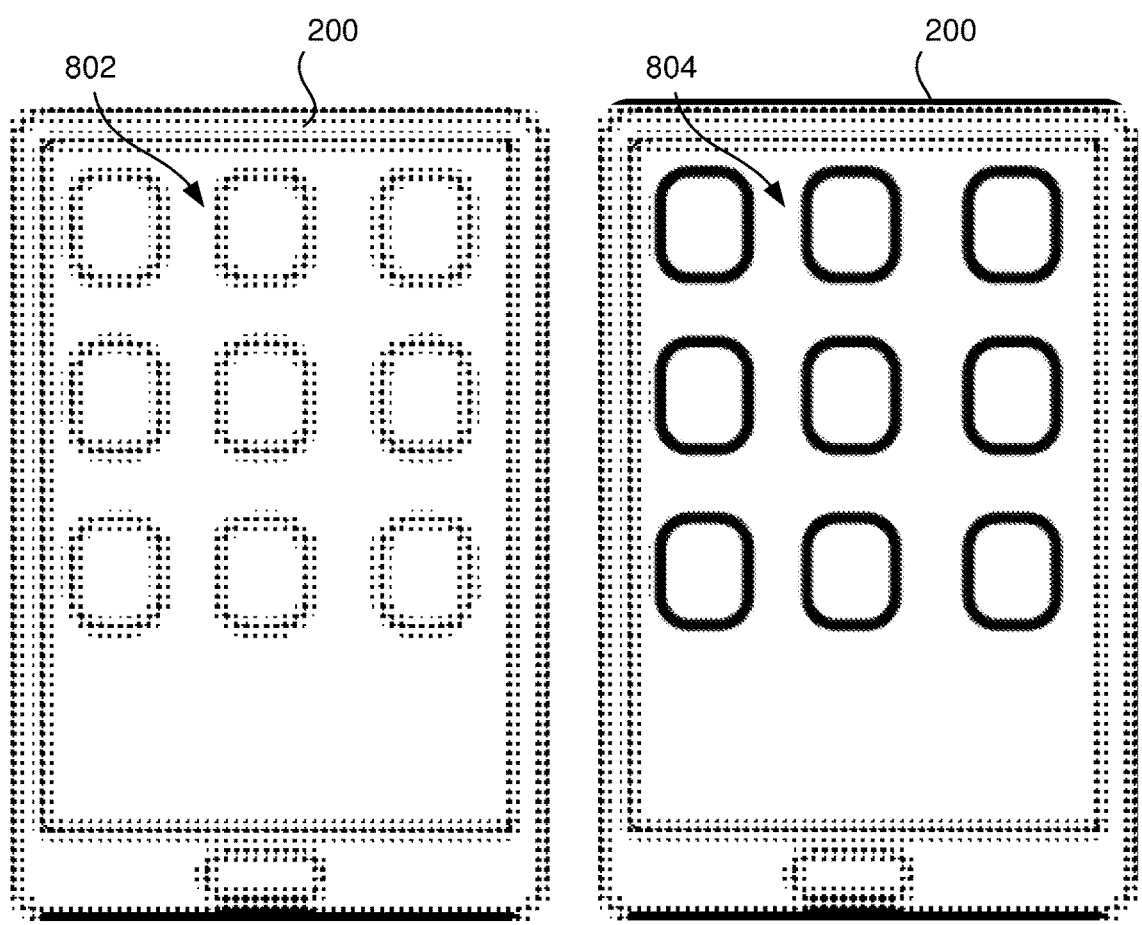

FIG. 8a illustrates a generic home screen display before activation of the modification.

FIG. 8b illustrates the generic home screen after activation of the modification.

Figure 9:
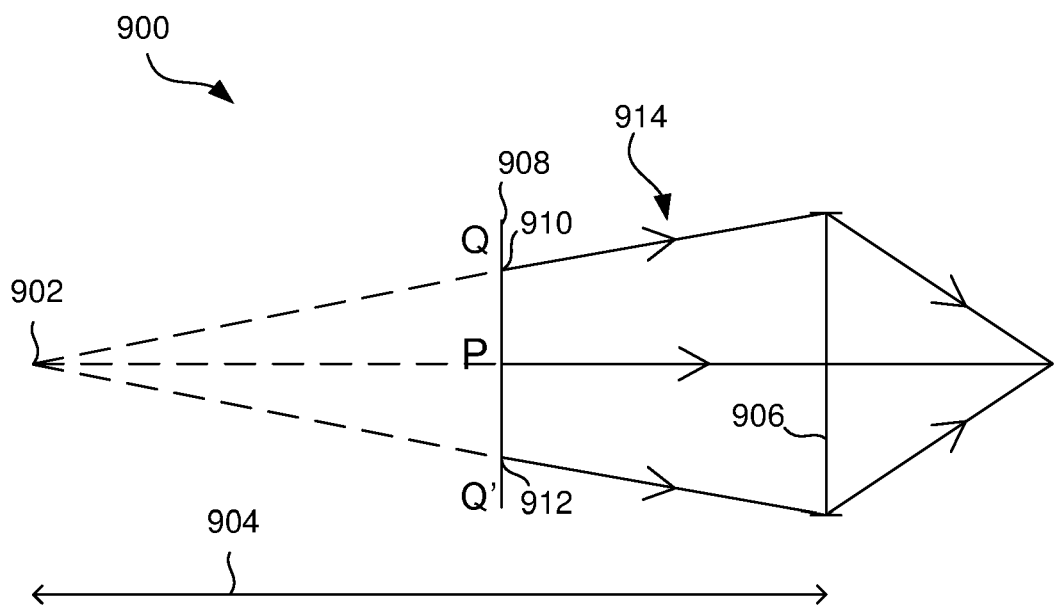

FIG. 9 illustrates an ideal ray-bundle (L=1.66 D) configuration for sharp focus by a presbyopic viewer who has a visual near point of 600 mm. In this ideal case, each pixel on the display screen only emits light in a single direction, which the viewer perceives as a single point (unblurred).

Figure 10:
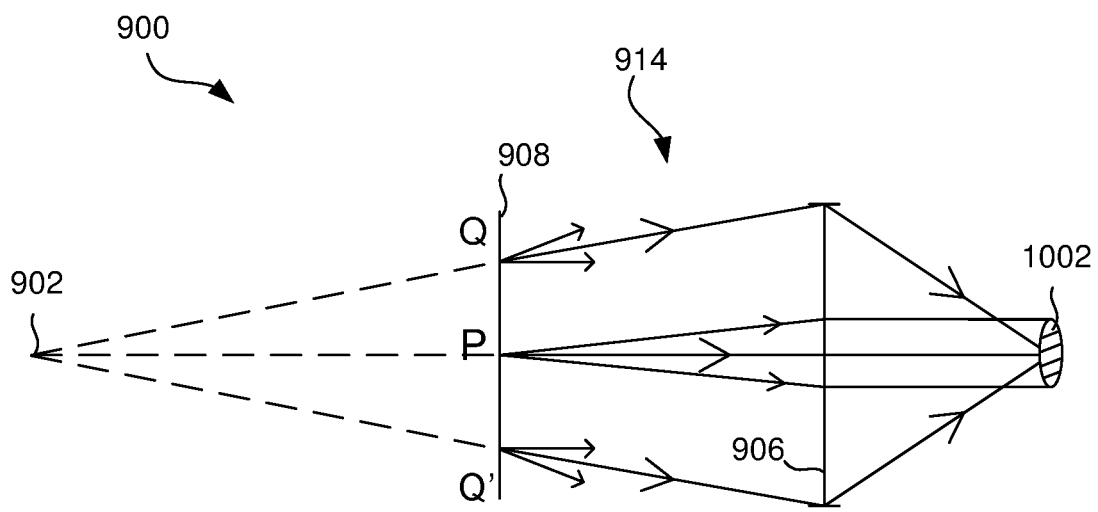

FIG. 10 illustrates the effect of a finite spread of ray directions at P and Q. This results in a blur spot, the size of which depends on the spread of ray directions at the pixels P, Q, Q', . . . on the display screen.

Figure 11:
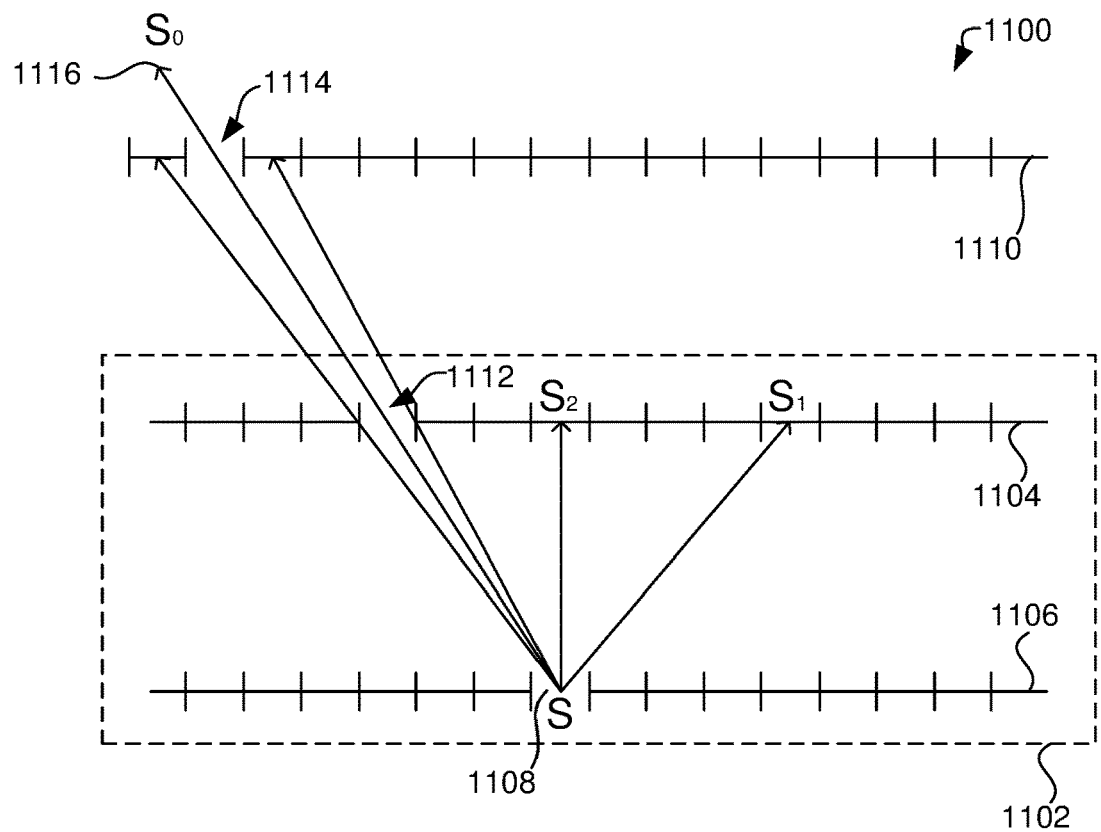

FIG. 11 illustrates a multilayer display showing how mask layers permit control of the direction of light emanating from the display.

Figure 12:
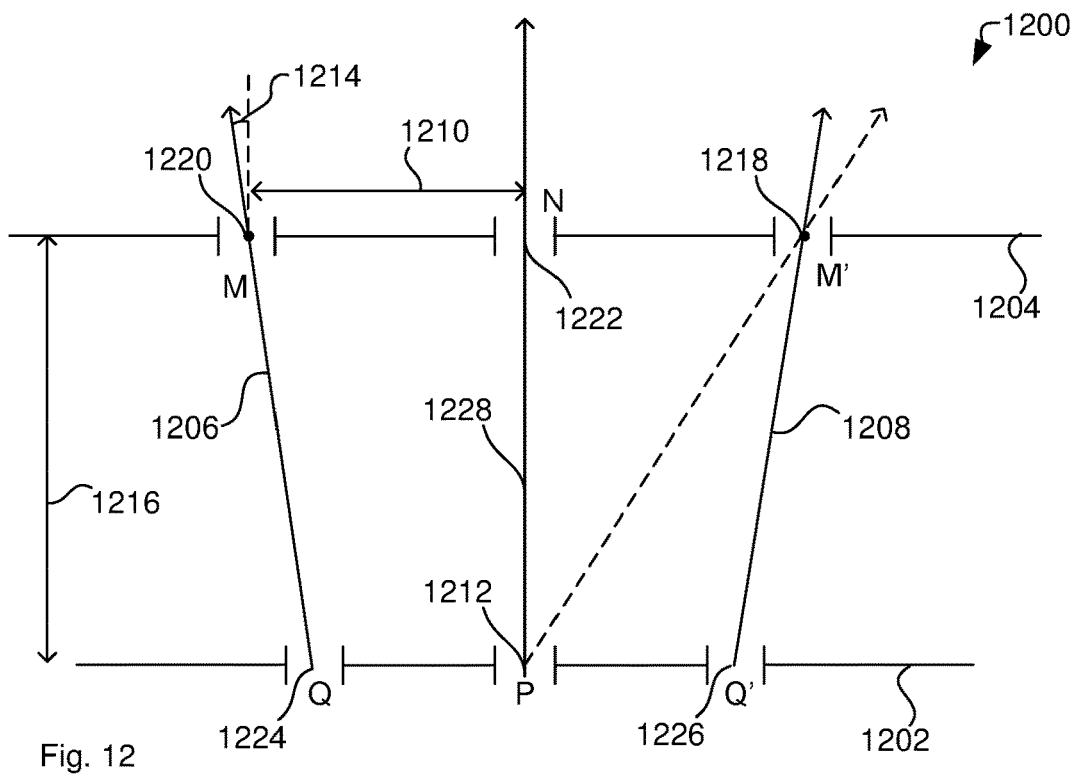

FIG. 12 illustrates the creation of a simple divergent ray bundle of prescribed vergence using a mask layer.

Figure 13A:
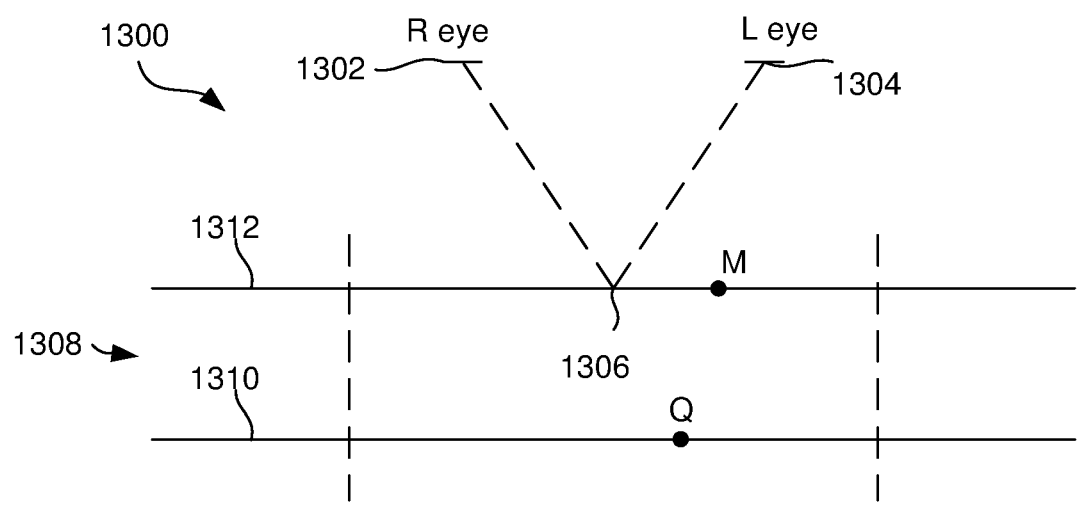

FIG. 13a illustrates the right (R) and left (L) eye of a user converged to a point on a display 300 mm in front of them.

Figure 13B:
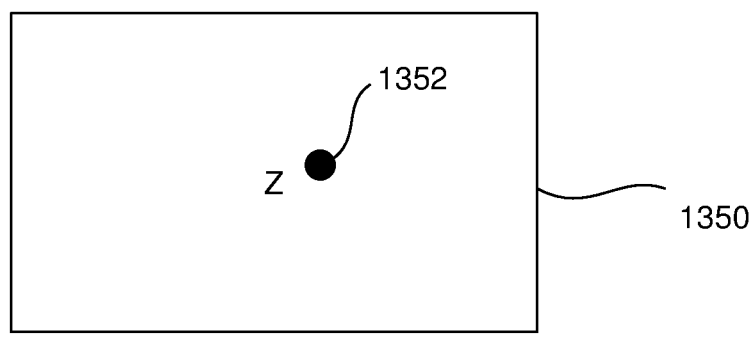

FIG. 13b illustrates an image plane.

Figure 14:
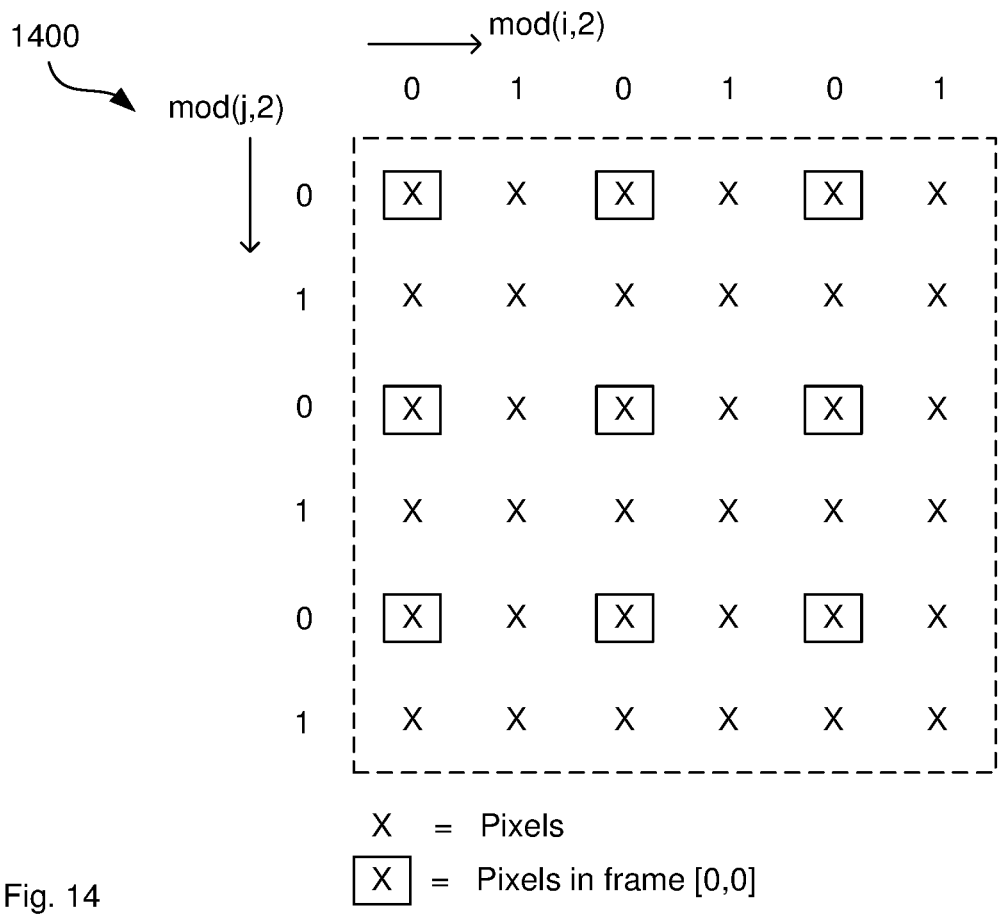

FIG. 14 shows an example of a $2^2$ partition used to define an image frame.

Figure 15:
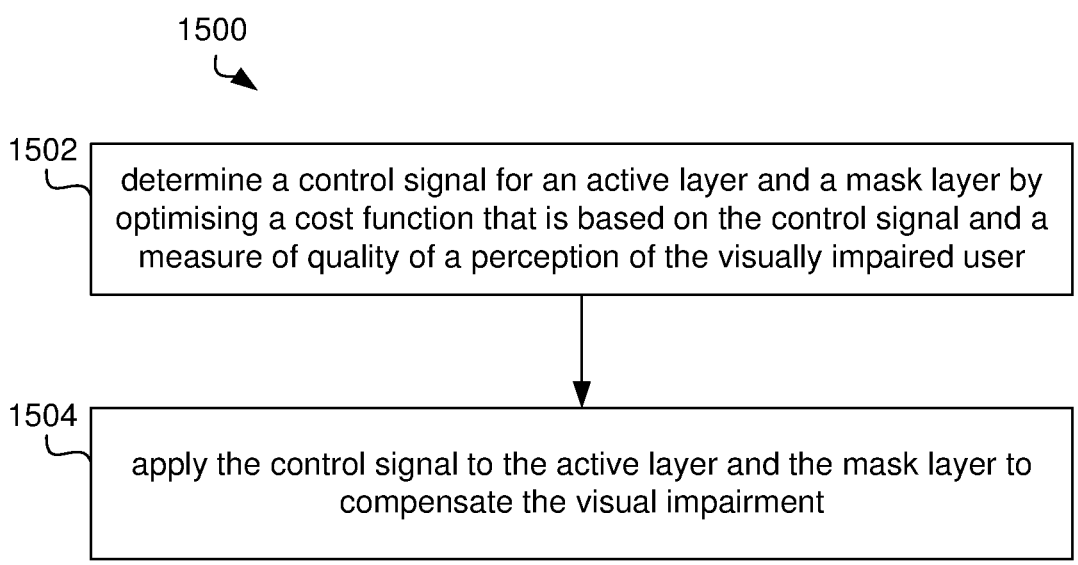

FIG. 15 illustrates a method for compensating a visual impairment of a visually impaired user.

Figure 16:
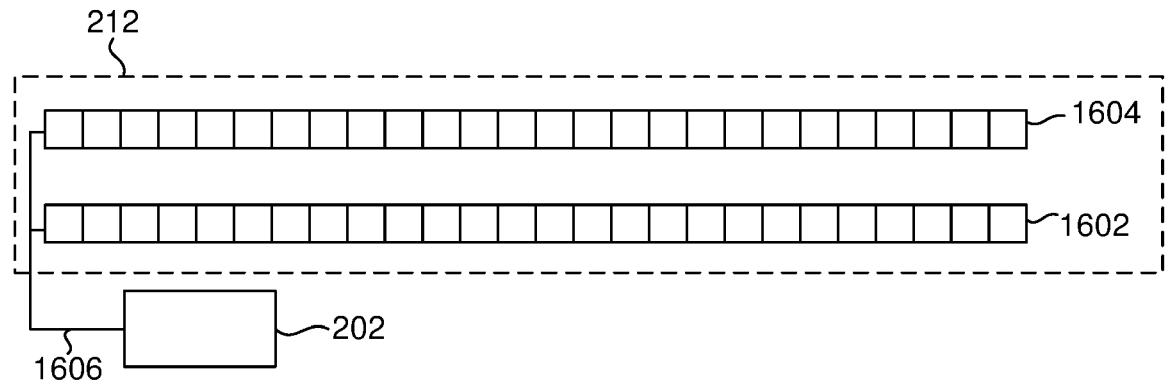

FIG. 16 illustrates an example architecture for a display for compensating a visual impairment of a visually impaired user.

Figure 17:
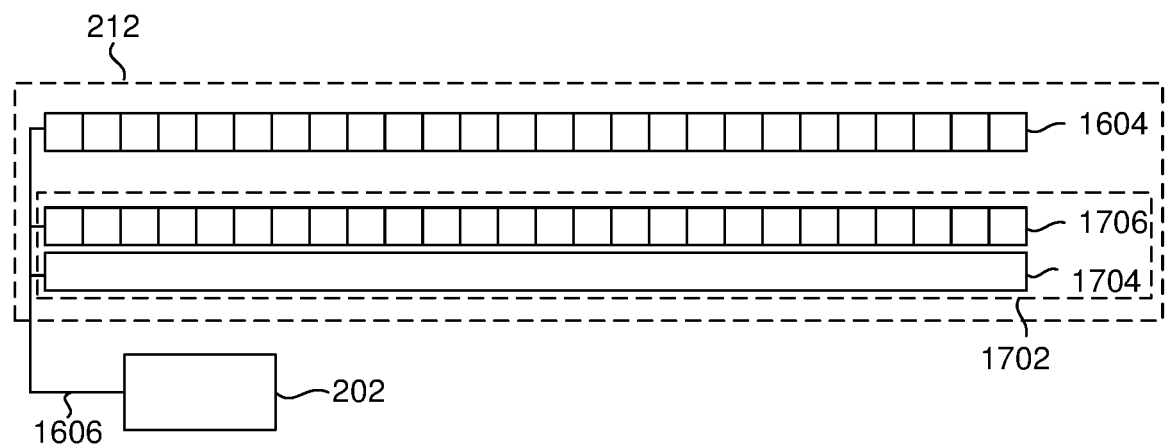

FIG. 17 illustrates a further example architecture for a display for compensating a visual impairment of a visually impaired user.

Figure 18:
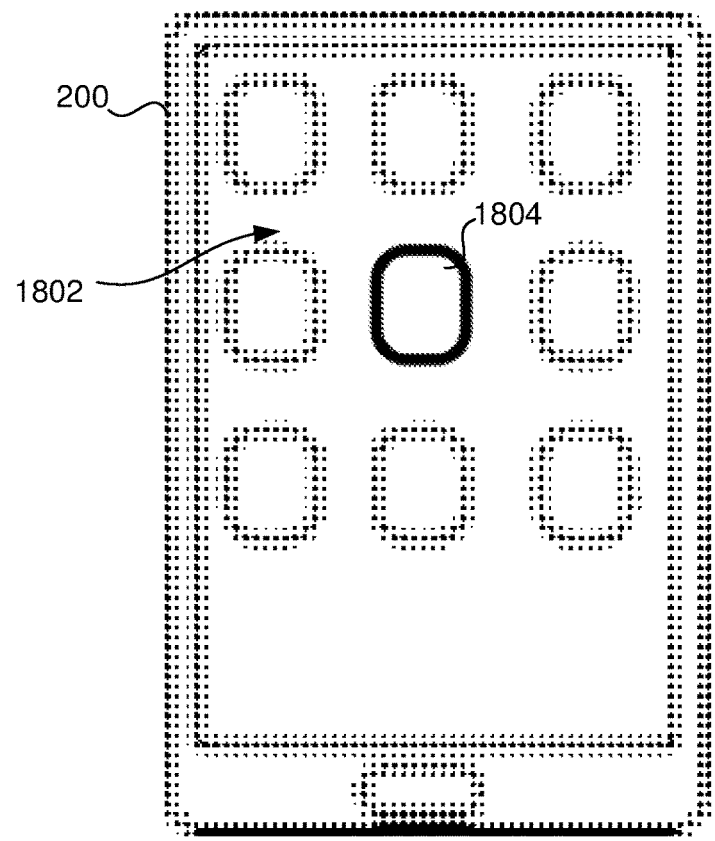

FIG. 18 illustrates another example of the generic home screen of FIGS. 8a and 8b.

Figure 19:
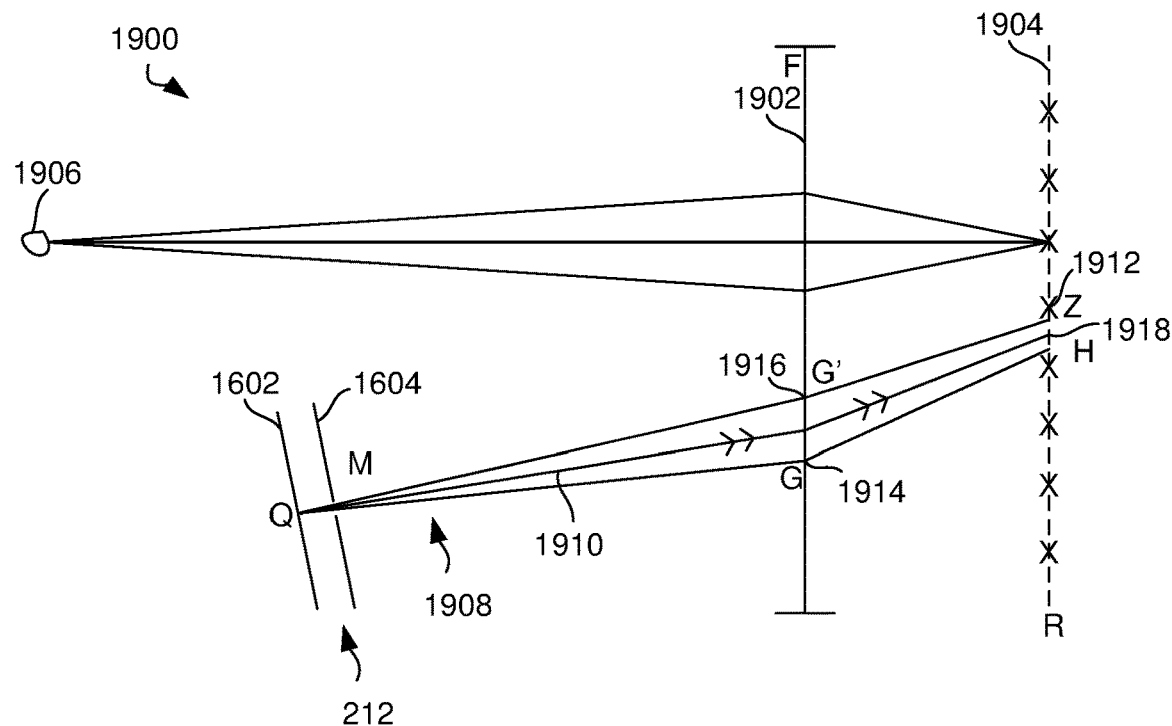

FIG. 19 illustrates a simplified representation of an optical system 1900 of the eye of the user.

Figure 20:
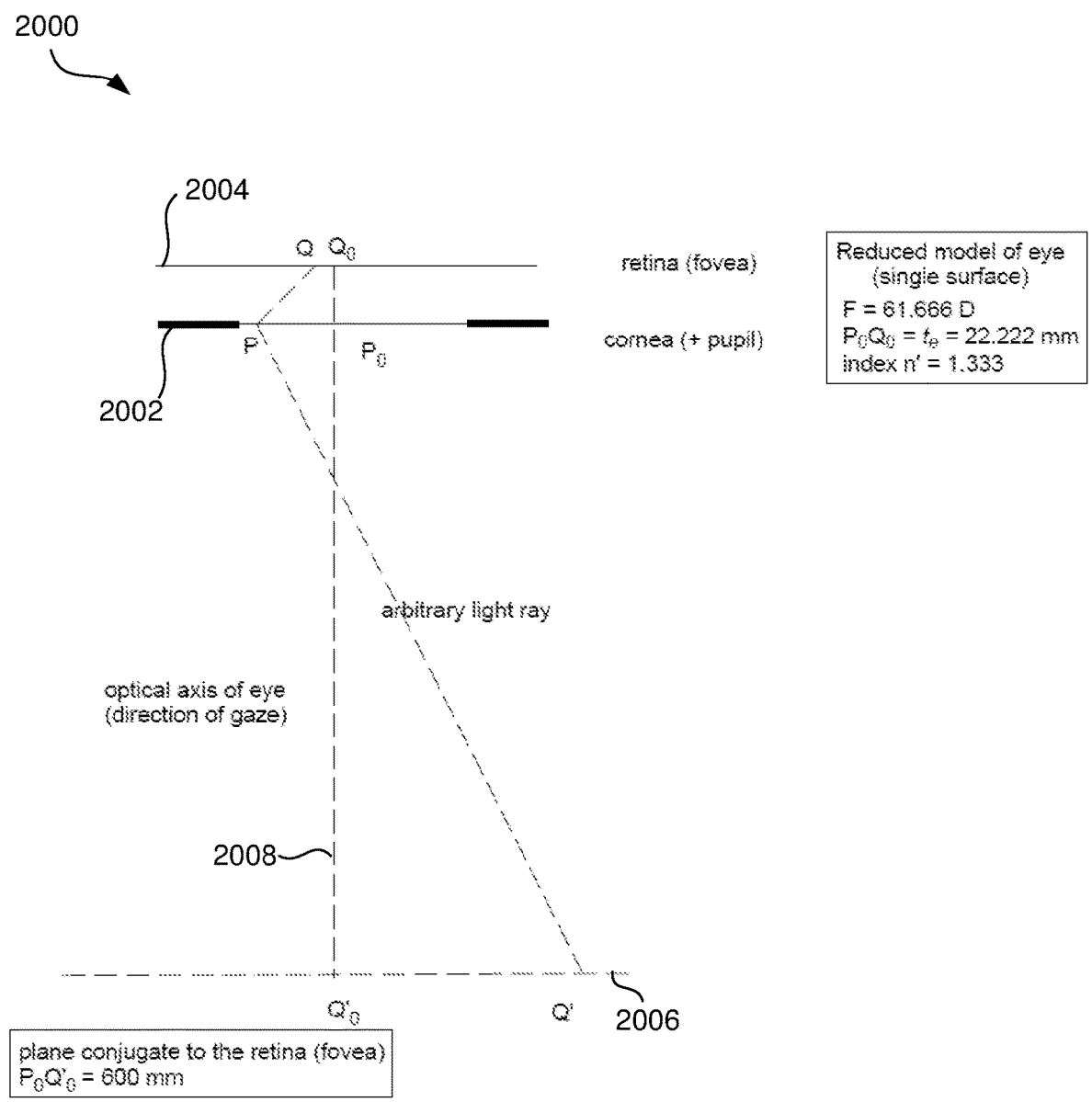

FIG. 20 illustrates a single surface model of the eye.

Figure 21B:
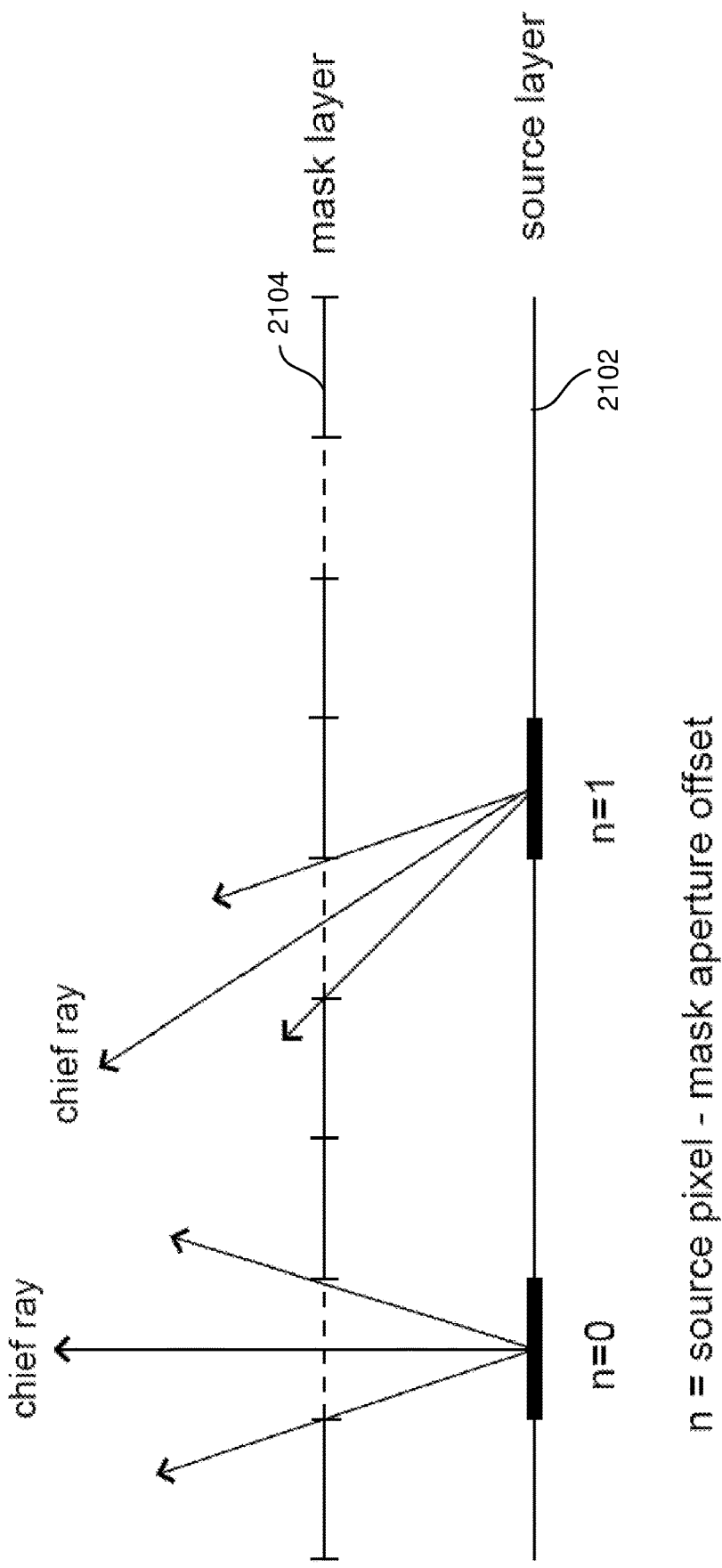

FIGS. 21a and 21b illustrate a multilayer display.

FIGS. 22a and 22b illustrate two full-size apertures of size δ, each with a 2×2 array of sub-apertures. If these full size apertures have offsets n and n+1, then the shifted grouping of sub-apertures is in effect a full size aperture, of size δ and offset n+½.

FIG. 23 illustrates a multilayer display with monocular straight ahead viewing.

Figure 24:
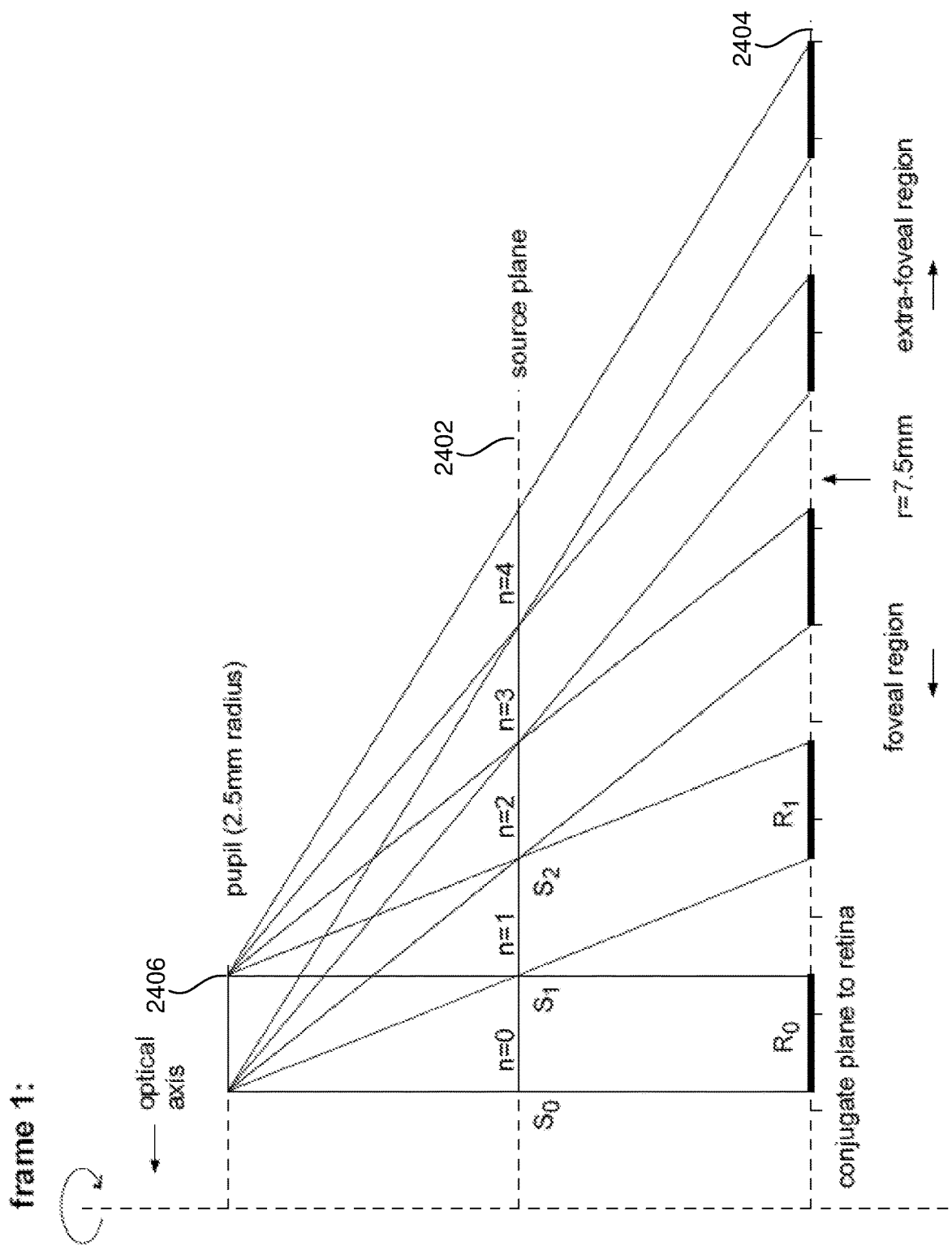

FIG. 24 illustrates an example of a construction based on a conjugate plane for a first frame.

Figure 25:
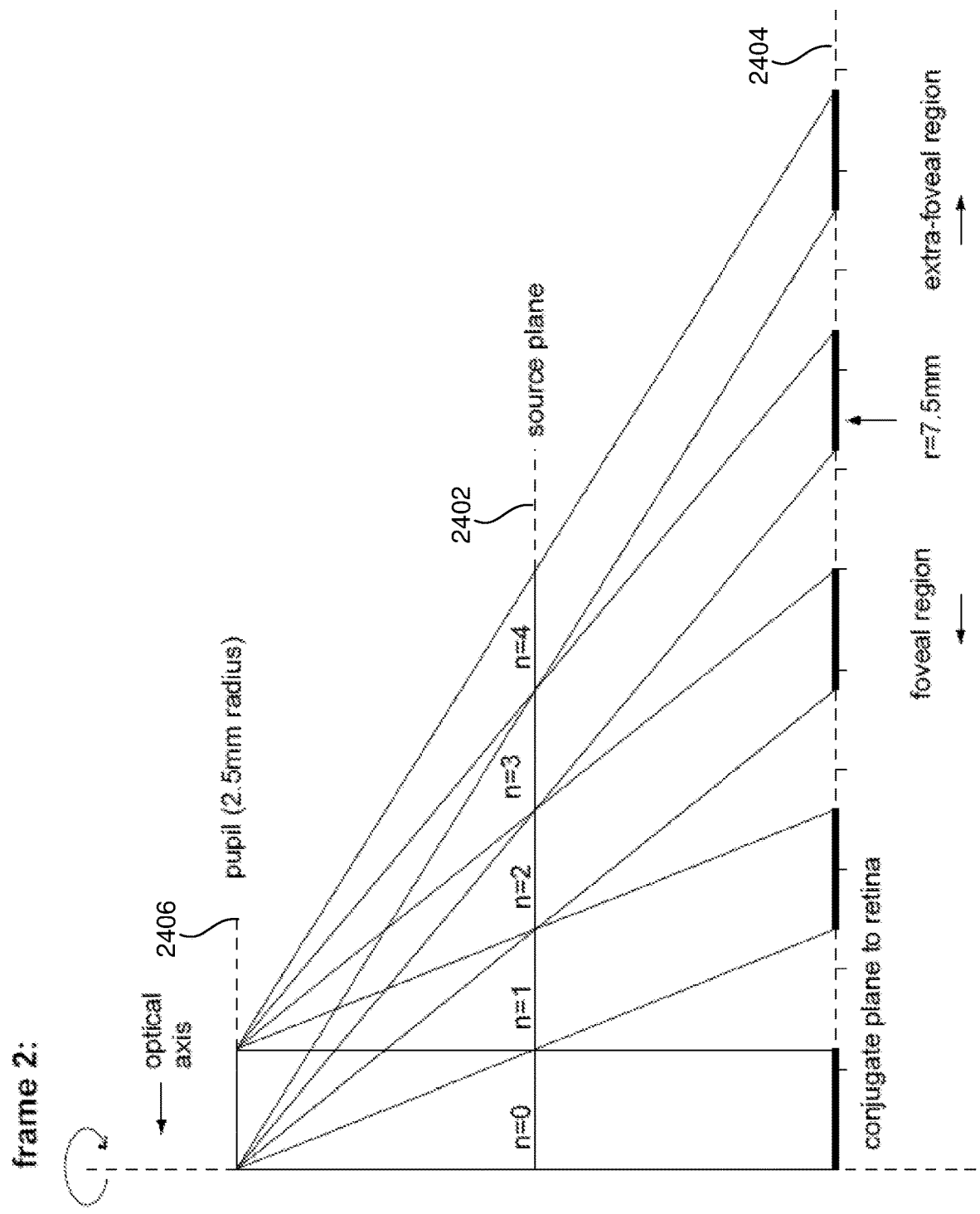

FIG. 25 illustrates an example of a construction based on a conjugate plane for a second frame.

Figure 26:
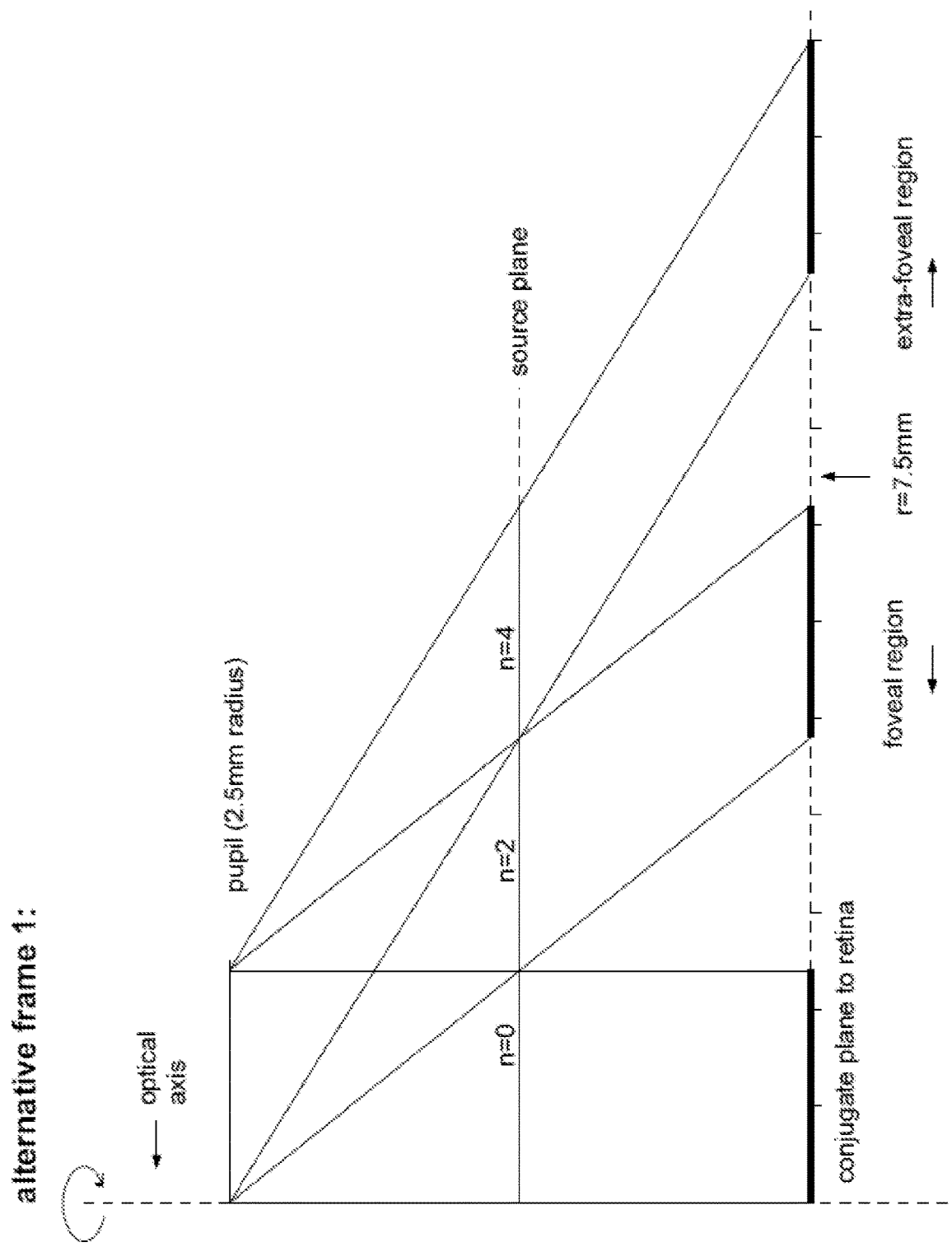

FIG. 26 illustrates an alternative example of a construction based on a conjugate plane for a first frame.

Figure 27:
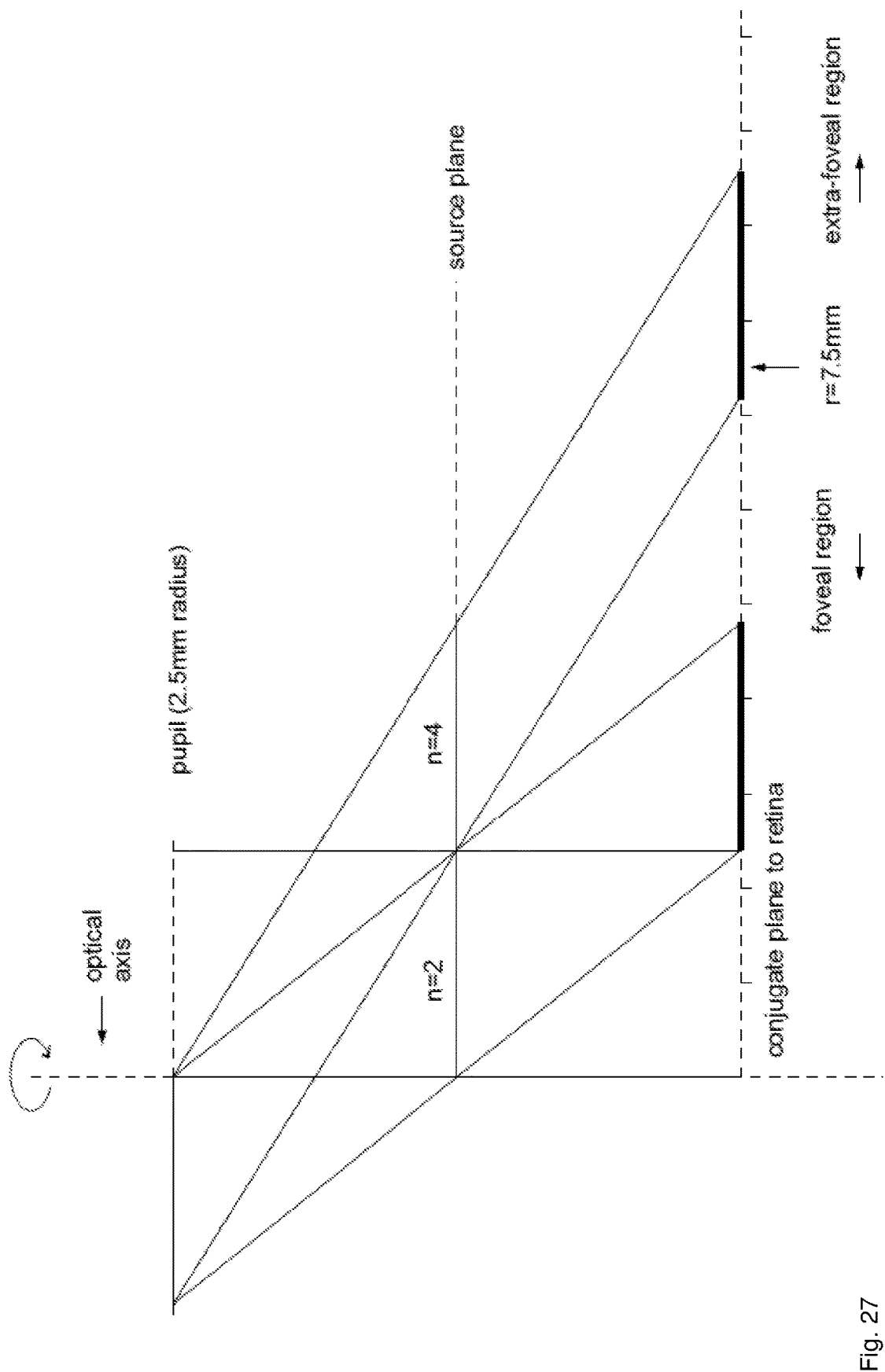

FIG. 27 illustrates an alternative example of a construction based on a conjugate plane for a first frame.

Figure 28:
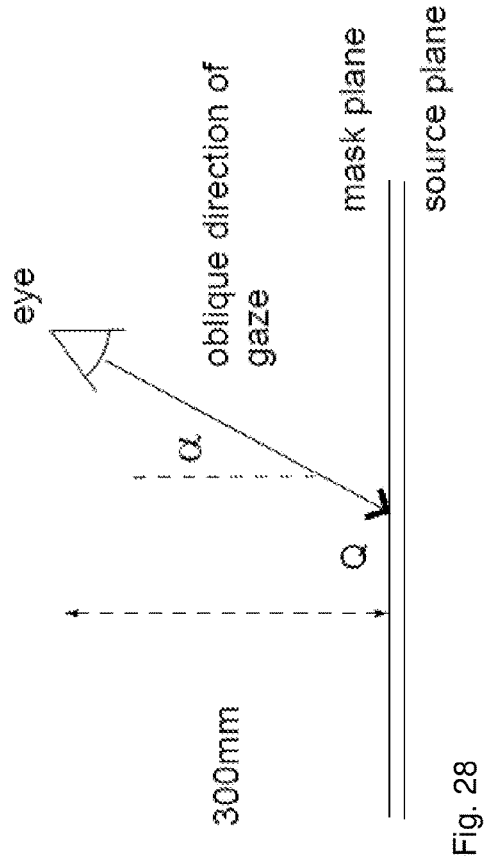

FIG. 28 illustrates a multilayer display with monocular oblique direction of gaze.

Figure 29:
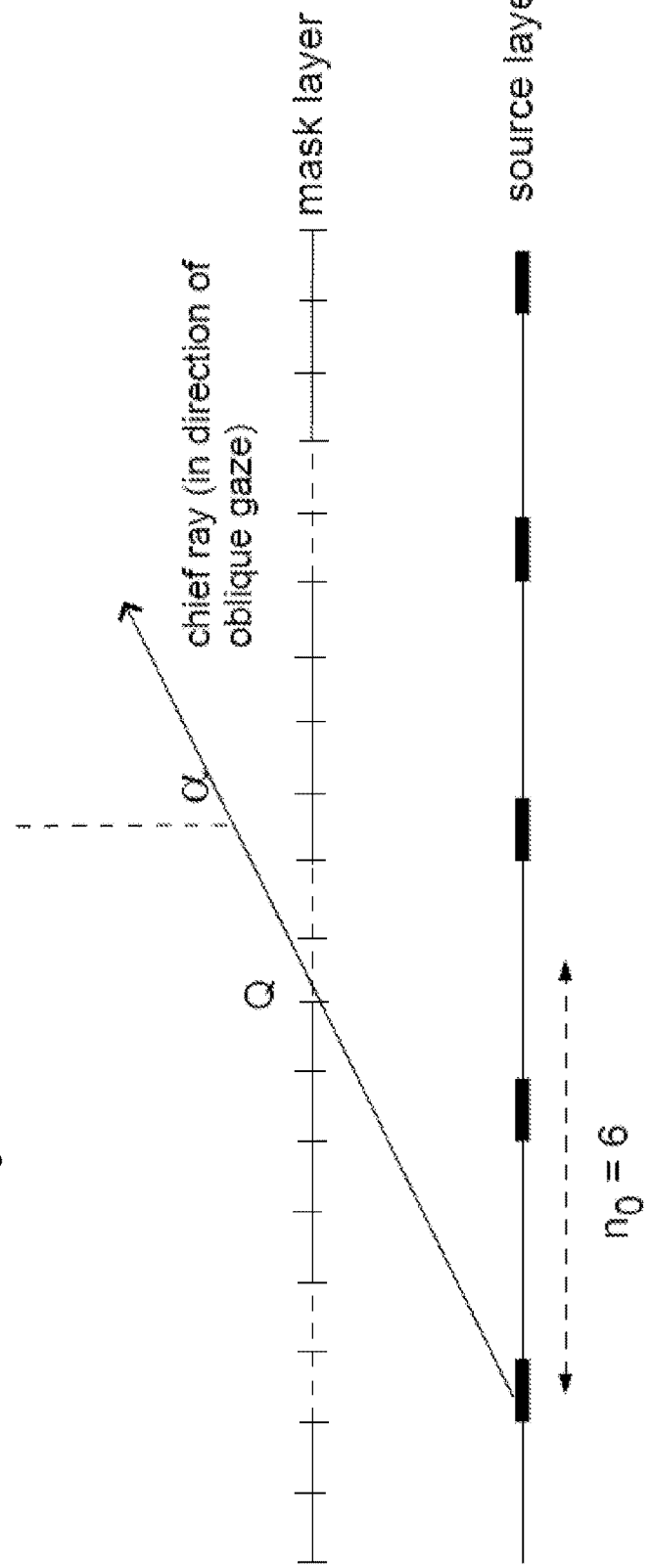

FIG. 29 illustrates the multilayer display of FIG. 28 with monocular oblique direction of gaze with more detail.

Figure 30:
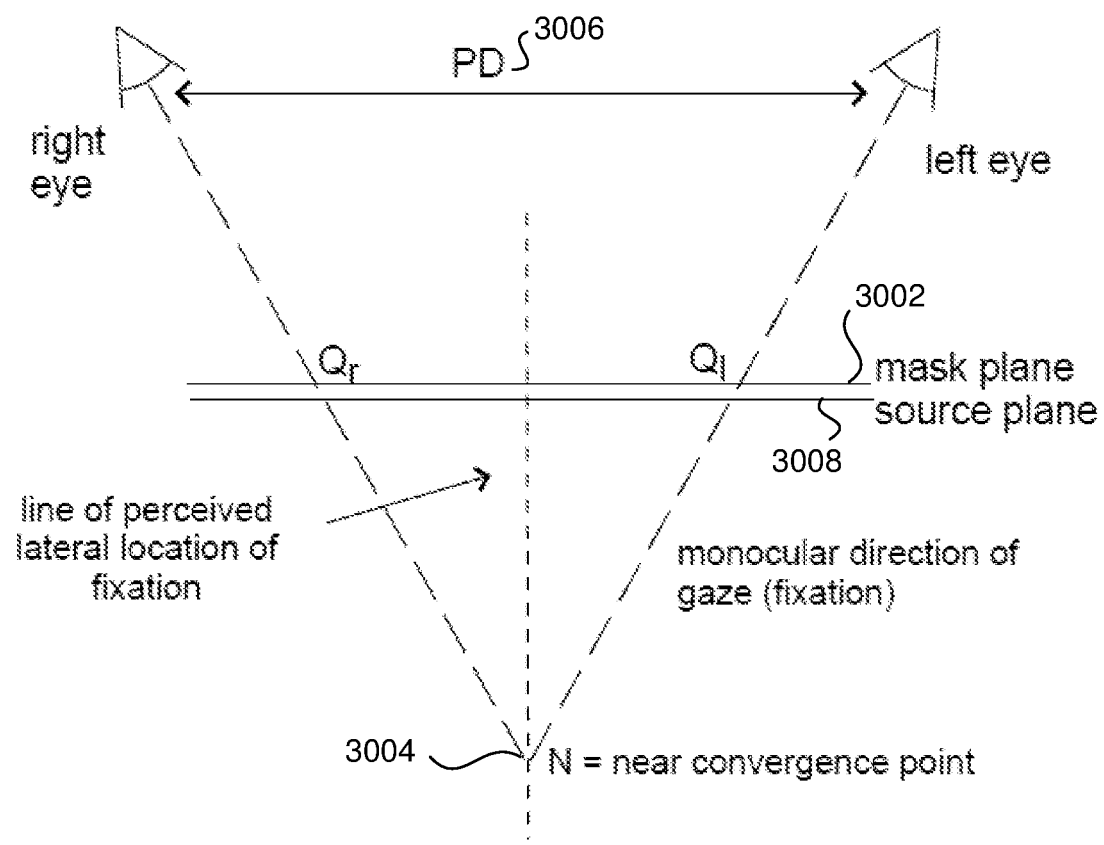

FIG. 30 illustrates binocular convergence state of a presbyopic viewer.

BEST MODE FOR CARRYING OUT THE INVENTION

Individuals with visual impairments, such as hyperopia or presbyopia, may use lenses, such as contact lenses or glasses, in order to interact with display devices. However, often these lenses are not available for various reasons because they have been displaced, damaged or not yet purchased. In these situations, it is difficult for the users to operate the device as the display appears blurred.

Further, particularly in the case of presbyopia, there may not only be an issue with availability of lenses but a social stigma may be attached with the age related need for reading glasses and the subsequent reluctance to wear glasses to operate display devices.

FIG. 2 illustrates a computer system 200, such a smart phone, for displaying a graphical user interface to a user with a visual impairment.

The computer system comprises a processor 202 connected to a program memory 204, a data memory 206, a communication port 208, such as a GSM, 3G, LTE or WiFi port, and a display port 210. The program memory 204 is a non-transitory computer readable medium, such as a hard drive, a solid state disk or CD-ROM. Software, that is an executable program, stored on program memory 204 causes the processor 202 to perform the method in FIG. 2, that is, the processor 202 receives a request for modifying the graphical user interface and modifies the graphical user interface. The software may further cause processor 202 to perform method 1500 in FIG. 15, that is, processor determines a control signal for an active layer and a mask layer by optimising a cost function that is based on the control signal and a measure of quality of a perception of the visually impaired user and applies the control signal to the display.

In one example, the software is a smartphone app, such as software provided by Apple's AppStore or Google Play, and operates as an overlay of the original display. In another example, the software is integrated into the operating system of the device 200 or uses system calls or procedures to directly modify the display.

The processor 202 may receive data, such as request data, from data memory 206 as well as from the communications port 208 and the display port 210, which is connected to a display 212 that shows the graphical user interface to a user. The display 212 may be a touch screen display that allows the user to input the request for modifying the display. As will be described in more detail below, the display may comprise an active layer and a mask layer both of which are connected to processor via display port 210.

Smartphone 200 may further comprise a camera 214 directed to the eyes of the user. The camera 214 continuously monitors the user's eyes to determine the eye gaze direction of the user and in particular, the point on the screen, that is, the coordinates of the pixels of the screen 212, at which the user is currently looking.

In one example, the processor 202 receives request data from a server via communications port 208, such as by using a Wi-Fi network according to IEEE 802.11. The Wi-Fi network may be a decentralised ad-hoc network, such that no dedicated management infrastructure, such as a router, is required or a centralised network with a router or access point managing the network.

Although communications port 208 and display port 210 are shown as distinct entities, it is to be understood that any kind of data port may be used to receive data, such as a network connection, a memory interface, a pin of the chip package of processor 202, or logical ports, such as IP sockets or parameters of functions stored on program memory 204 and executed by processor 202. These parameters may be stored on data memory 206 and may be handled by-value or by-reference, that is, as a pointer, in the source code.

The processor 202 may receive data through all these interfaces, which includes memory access of volatile memory, such as cache or RAM, or non-volatile memory, such as an optical disk drive, hard disk drive, storage server or cloud storage.

It is to be understood that any receiving step may be preceded by the processor 202 determining or computing the data that is later received. For example, the processor 202 determines request data and stores the request data in data memory 206, such as RAM or a processor register. The processor 202 then requests the data from the data memory 206, such as by providing a read signal together with a memory address. The data memory 206 provides the data as a voltage signal on a physical bit line and the processor 202 receives the request data via a memory interface.

In one example, display 212 comprises an active layer and a controllable mask layer above the active layer as will be described further below. In that example, processor 202 determines a control signal to control the active layer and the mask layer to replicate the optical effect of one or more optical lenses. This means the processor 202 controls the layers such that the beams arrive at the retina 106 of the user's eye similarly to how they would arrive if that user would see the display through optical lenses.

FIG. 3 illustrates a method 300 as performed by processor 202 for displaying a graphical user interface on a display to a user as performed by processor 202. As mentioned earlier, method 300 is implemented in source code, which is compiled and stored on program memory 204. The user generates a request for modifying the display, such as by inputting the required data into an input form generated by the processor 202 and displayed on display 212.

FIG. 4 illustrates a display 402 that allows a user to sign up to a service that orchestrates the modification of the graphical user interface. The display 402 comprises a name input field 404, an email input field 406 a password input field 408, a re-enter password input field 410 and a lens selection field 412. The user enters all the required information into the fields 404, 406, 408 and 410. The lens selection field 412 allows the user to select one or more of multiple candidate optical lenses.

FIG. 5 illustrates the display 402 after the user has tapped the lens selection field 412. The processor 202 generates a selection form 502 that presents to the user multiple candidates for optical lenses, such as prescription lenses. The advantage of using prescription lenses is that they are easily characterised by an identifier, such as type. The user can consult an optometrist to provide the identifier of an optimal prescription lens for the particular vision impairment. Using this identifier the user can conveniently select the appropriate prescription lens. In another example, the user is allowed to select two different lenses if the impairment differs between the two eyes of the user.

In some areas the presbyopic population is significantly larger than the hyperopic population and the lens type for correcting presbyopia is more 'basic' than for correcting hyperopia. As a result, it is less complex to standardise lenses for presbyopia into different types and therefore, the proposed systems and methods are particularly advantageous for this visual impairment.

Once the user has selected one or more of the list of candidate optical lenses 502, the user submits the form by tapping a submit control field 504. This causes the smartphone 200 to transmit the user information to a server via the Internet over LTE, for example. In one example, the server is implemented as an Internet service in a cloud computing environment. The server creates a user account and stores the identifiers of the selected prescription lenses associated with the user account in a database.

FIG. 6 illustrates a display 602 to allow the user to activate the modification of the graphical user interface by tapping an activation control field 604. This way the processor 202 receives a request for modifying the graphical user interface as represented by step 302 of method 300 in FIG. 2. After the user taps the activation control field 604, the processor modifies 304 the graphical user interface to compensate for the visual impairment of the user. To achieve this effect, the processor 202 replicates an optical effect of the selected prescription lenses. That is, the processor 202 determines the refraction of light that would be caused by the user wearing the prescription lenses and applies the determined refraction characteristics to the graphical user interface. In particular, applying the refraction characteristics may comprise processor 202 applying control signals to an active layer and a mask layer to direct beams from the display pixels at an angle to compensate for the visual impairment.

Similarly, the processor 202 may generate a display that allows the user to de-activate the modification of the graphical user interface.

FIG. 7 illustrates a display 702 to allow the user to provide previously defined user credentials by inputting information into a name input field 704, an email input field 706 and a password input field 708. The smartphone 200 sends the provided user credentials to the server and the server checks whether the password is identical to the password previously stored in association with the entered name and email address. If the password is correct, the server allows the smartphone 200, and thereby the user to access the account that is associated with the user and with the previously selected prescription lenses.

Once the password is checked and the user is logged in, the user may be presented with a similar display as in FIG. 5 to activate the modification of the graphical user interface.

It is noted that the difference above between 'display' and 'graphical user interface' is arbitrary and the term 'graphical user interface' can relate to everything that is displayed by the smart phone 200. For example, if a user starts another independent smartphone app after activation of the modification, the display of the independent smartphone app is also modified by processor 202 as described herein. A graphical user interface may also be a video player, for example, or any other software application that presents video or image data to the user. The graphical user interface may display text, images, static and dynamic videos, passive view only, such as a photo slideshow, and interactive view, such as a text processing application or social media application.

FIG. 8a illustrates a generic home screen display 802 before activation of the modification as perceived by the vision impaired user. It can be seen that the display 802 as well as the device 200 are perceived blurred and it is therefore difficult for the user to operate the device 200 efficiently.

FIG. 8b illustrates the generic home screen 804 after activation of the modification as perceived by the vision impaired user. It can be seen that the display 804 is now modified such that the visual impairment is compensated for. Since the processor 202 replicates the optical effect of the prescribed lenses, the degree of modification is such that the display 804 is perceived as crisp and it is now possible for the user to operate the device 200 efficiently. Interestingly, the device 200 itself is still perceived blurred. However, this has little negative effect on the usability of the device 200 by the user given the majority of the user's interaction with the device occurs with the display 804 and not the hardware of the device 200 itself.

While the method has been described above in relation to a smartphone, it is to be understood that other display devices may similarly perform this method, such as television sets, tablet computers, personal computers, digital cameras, white goods and in vehicles and air craft.

FIG. 9 shows an optical system 900 where complete control over light direction at a pixel is possible. The optical system comprises a visual near point 902 of the user with a distance 904 of about 600 mm from a pupil aperture 906 of an eye and a display screen 908 located about 300 mm from pupil aperture 906. The diameter of the pupil aperture 906 may be 5 mm.

To obtain an image of a "single" pixel that is sharp on the user's retina, multiple pixels over a small region of 2.5 mm, for example, between a first point Q 910 and a second point Q' 912 (QQ') of the display 908 emit light in specific directions as an in-focus ray bundle 914 as indicated in the figure. In reality, however, each pixel emits light over a range of directions as is shown in FIG. 10, which will still result in blurring as illustrated by blur spot 1002, but to an extent less so than in a conventional display.

Any particular display pixel belongs to a number of such small multiple pixel regions, and so will be called upon to provide different intensity and colour information corresponding to each region. A variety of techniques can be used to achieve this. These include:

1. Each pixel P, Q, Q', . . . repeatedly displaying in a cyclic pattern a series of data in rapid succession in time, relying upon the principle of retention of visual sensation for the retina to perceive a multicomponent image.

2. Each pixel may consist of multiple sub-pixels which can be independently controlled regarding intensity and colour.

3. Each pixel displays an intensity and colour sum of its components.

The various parameters that are taken account of in any practical embodiment of this concept include 1. The size of the region QQ' which is ideally imaged to a point. This is closely related to the diameter of the pupil.

2. The spread of ray directions associated with each pixel Q, P, Q', . . . . This is a largely a function of the display technology.

3. The direction in which the user is viewing the display. This can either be assumed and fixed, or determined dynamically by use of "smart screen" eye-tracking technology that is currently present in many smartphone, 3D stereoscopic displays and other devices.

4. The field of view of the user. Here it is to be noted that control of blur is of greatest importance in the small region of foveal vision. This is typically only ±1 degrees with respect to the straight-ahead direction. Outside this region (which corresponds to the central fovea of the eye), the retina has low visual acuity and is relatively insensitive to blur.

5. The viewing distance of the display screen. Again, this can either be assumed and fixed, or determined dynamically by use of "smart screen" eye-tracking technology that is currently present in many smartphone, 3D stereoscopic displays and other devices.

6. The user's refractive correction. This is a user-specific piece of data that the user may input as described above with reference to FIG. 5.

These parameters may have conflicting roles in controlling blur.

This disclosure describes a method that takes into account one, more or even all of these parameters and defines a general method for controlling the image that should be displayed on the screen (at pixels P, Q, Q', . . . ) so that a user perceives the smallest possible blur when viewing the screen, and so is able to view the display with maximum convenience, comfort and ease. Moreover, the disclosure describes how a practical embodiment of this can be achieved on a smartphone, tablet, computer monitor, laptop or similar display device.

Visual Display Technologies that Control or Manage Ray Direction

Display device technologies may employ a light source which is either an array of luminescent elements, such as LEDs; or may employ a matrix mask whose elements can be turned on or off in order to transmit or block light which comes from a backlight source behind the mask. An LCD display is an example of this latter technology. Thus the pixel is physically either a luminescent element or an aperture through which background light passes. In either case, this pixel is able to be switched on or off by electronic means. Various elements, methods and pixel patterns may be used to achieve desirable image properties, such as colour, resolution and power use efficiency.

FIG. 11 illustrates a multilayer display 1100 that may be one enhancement of this technology. FIG. 11 shows an example of how such a display can be used to emit a bundle of light rays with a small angular variation in direction at a point. Display 1100 comprises a light source 1102 comprising a mask layer 1104 and a source layer 1106 with uniform background illumination (such as may be the case for a backlit LCD display). However, an array of luminescent sources could also fill this role.

In the absence of any other layers, the light emanating from a pixel S 1108 has a large spread of angular directions. However, by introducing a subsequent masking layer 1110, and by suitable selection of apertures, such as apertures 1112 and 1114 to be either open for transmission, or closed, and so blocking transmission, it is possible to obtain an emerging ray bundle which has a chief direction at the point S0 1116 and a relatively small spread in direction about this chief direction.

It is to be noted that the mask layers 1110 and 1104 may in any particular embodiment be static (as in a pin-hole mask), or dynamic, which means that the apertures which are open or closed are controlled dynamically, typically by electronic and programmatic means. Alternatively, it is possible that the transmission through the aperture be continuously controlled between fully opened and completely closed.

Point Image

Consider again the particular case of a user whose near visual point is 600 mm (1.66 D), and who desires to see clearly a display at a distance of 300 mm. This would be typical of a presbyopic user who needs a +1.50 to +2.00 D addition for near vision at 300 mm.

FIG. 12 shows an example design of a display 1200 with a light source layer 1202 and one additional mask layer 1204 which will present to the user a configuration of rays, such as rays 1206 and 1208, that, when viewed by the user, will be imaged on their retina as a sharp point image. This collection of rays is sufficiently divergent for the user with a visual near point at 600 mm to comfortably focus these rays to a sharp image. In other words, the divergent rays (L=1.66 D) are focussed sharply by eye. The collection of emerging rays has a vergence of 1.66 D, which means that at a displacement 1210 of 1.25 mm from the central ray through point P 1212, the emanating ray has a relative direction 1214 of approximately 15 minutes of arc. The distance 1216 between the two layers may be 20 mm.

There are many possible designs which can achieve this objective. The design factors that are involved include the dimensions and pitch of the pixels in the source layer, the dimensions and pitch of the apertures in the mask layer 1, the distance between these layers, the user's direction of gaze and the relative intensity of light from the source pixels. In some examples, apertures and pixels are not arbitrarily small because of limiting diffractive effects.

Although as presented here, this example only relates to one additional layer, this disclosure covers the use of any number of additional layers which can selectively transmit or block light, either entirely or in part, or according to colour or polarisation.

Although as presented here, this example only uses three pixels Q 1224, P 1212 and P' 1226 in the light source layer 1202, and only three apertures in the mask layer 1204, it can be readily extended to greater numbers of pixels or apertures, particularly to a two-dimensional configuration of pixels and apertures.

FIG. 12 also shows that a peripheral ray from P 1212 may exit at the point M' 1218 on mask layer 1204. Such a ray may not be focussed sharply by the eye at the retinal image point of the main rays 1206 and 1208 shown as solid lines in FIG. 12. Likewise, there may be peripheral rays through the other apertures M 1220 and N 1222 arising from the other pixels Q 1224 and Q' 1226. By careful choice of the design factors listed above processor 202 can minimise this blurring effect, consistent with other design requirements. This optimisation can be performed by the use of design optimisation techniques. It is also to be appreciated, that the radiant intensity of light emitted from pixels typically diminishes with ray obliquity.

It is to be appreciated, that the direction of gaze of the user is an important input to the design. An eye-tracking application may be installed on smartphones and tablets. Such technology is able to assess a user's direction of gaze.

Extended Image

It is desirable not just to produce an image of a point, but to produce a retinal image of a spatially extended object. Such an image can be composed of the superposition of the images of many points. Thus, as a starting point, the method disclosed above may be used for this purpose. However, by itself, this may produce an unsatisfactory image quality due to the multiple use of the same pixels and the same apertures to produce different point images. This is similar to the "cross-talk" phenomenon which occurs in a number of other areas in communication and imaging technologies. To overcome this difficulty, the following approaches may be used, either singly or together in any combination.

a) Time base multiplexing, that is the pixel intensity and the aperture transmission rapidly cycle through the patterns requires for the multiple point images. This relies upon the short dynamic response time of the light source and mask technology to be electronically remapped to different patterns, and the principle of retention of visual sensation for the retina to perceive a multicomponent image.

b) Each pixel and each aperture may consist of multiple sub-pixels and sub-apertures respectively which can be independently controlled regarding intensity, colour and transmission.

c) Each pixel displays an intensity and colour sum of the various multiple image points that it needs to contribute to.

d) Design optimisation techniques can be used to minimise the overall undesirable blurring effects of the "cross talk" between the image points. This can be performed by employing design optimisation techniques from existing areas of engineering, mathematics, statistics and computer science which are widely used for optimising signals in the presence of "cross-talk". Such techniques frequently include the use of least squares optimisation, filtering, frequency and Fourier analysis.

In such optimisation, the objective function to be minimised is a mathematical representation of the user's perceived blur, often expressed in terms of a blur spot kernel. This expression takes account of the unique features of the human visual system, including field of foveal vision, variable pupil size, binocular effects, convergence effects and saccades, to the extent that they are important.

The design parameters that are available for manipulation include:
    the dimensions and pitch of the pixels in the source layer,
    the dimensions and pitch of the apertures in the mask layer 1 (and additional layer, if present), the distance between these layers,
the user's direction of gaze and
the relative intensity of light from the source pixels.

Any display hardware constraints may be respected in performing this optimisation. The design optimisation operation referred to in d) may be static, that is carried out once (off-line) and applied for all extended images; or it may be dynamic, that is carried out in real time for each extended image; or it may be a combination of both, with some static features and some dynamic features. It is to be appreciated that a full dynamic optimisation is computationally demanding in terms of processor time and memory.

Thus, it is often preferable in practice to undertake considerable static optimisation, which can be done off-line, where time and memory requirements are of lesser concern; and to restrict real-time dynamic aspects to operations that are computationally less demanding.

Unless noted otherwise, the term "real-time" means that the calculations for one image are completed before the next image is to be displayed. For example, for video with a frame rate of 30 fps, each image is calculated within 1/30 s.

Figure 1:
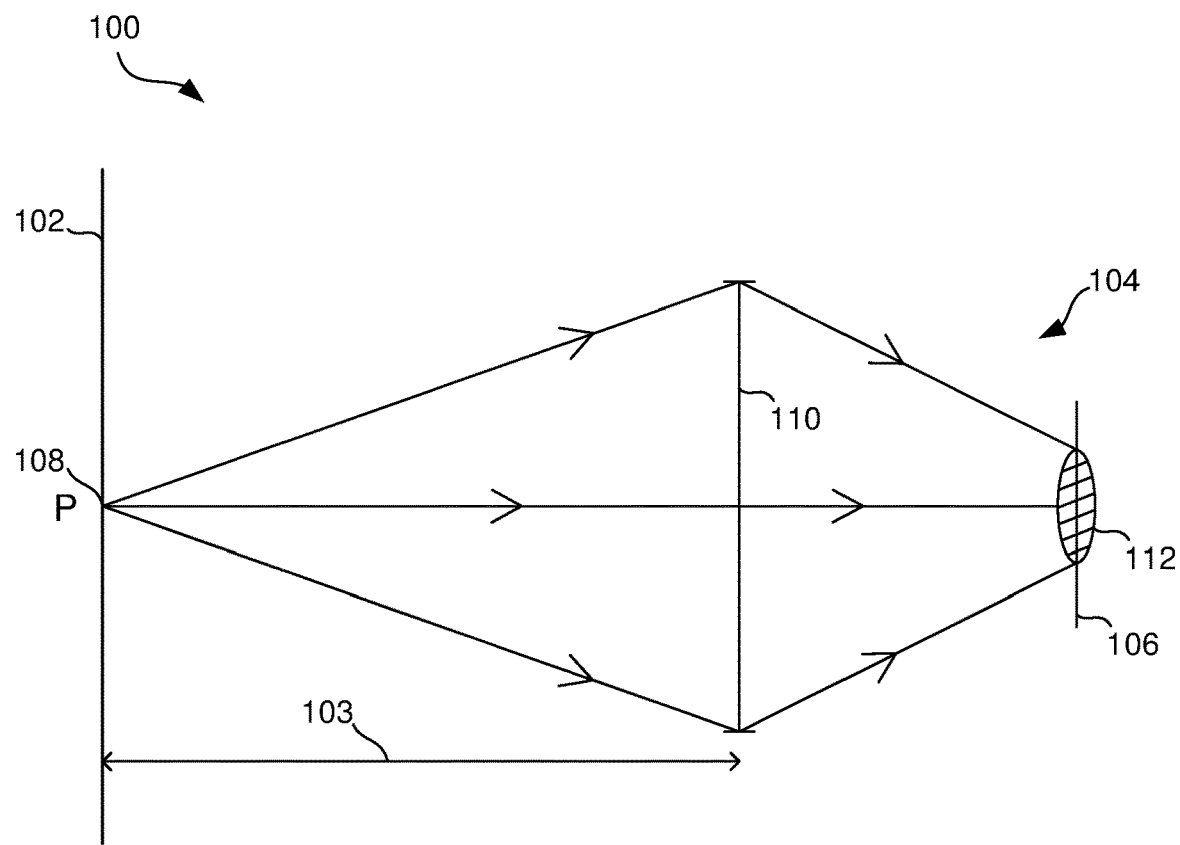
FIG. 1 illustrates how light from pixel P on the display is emitted in a spread of directions and falls upon the pupil of the eye of a user. If the screen is closer than the visual near point of the user, then the user's eyes cannot refract the light sufficiently, and blurring will occur.

With respect to FIG. 12, let d denote the separation between the source layer 1202 and the mask layer 1204; and let a denote the diameter of the apertures in the mask layer 1204, as would apply at the points M 1220, N 1222 and M' 1218. With respect to FIGS. 1, 9 and 10, let p denote the diameter of the entrance pupil of the eye; that is, all rays of light impinging on the front surface (cornea) of the eye within a circle of diameter p, centred on the straight ahead direction of gaze of the eye, are refracted by the front surface of the eye into the interior of the eye.

The ray bundles emerging from the apertures centred on M 1220, N 1222 and M' 1218 as shown in FIG. 12, when projected to the front surface of the eye of a viewer should impinge on an area smaller than the full pupil area. The reason for this is that the blur experienced by the viewer arising from an out-of-focus ray bundle is proportional to the area of the front surface of the eye that the ray bundle impinges. In normal viewing situations, this is the full viewing area. In one example, each of the ray bundles centred on QM 1206, PN 1228 and Q'M' 1208 in FIG. 12, is out-of-focus by 1.666 D (as they originate from the source layer at a distance near to 300 mm from the viewer). However, by determining the design parameters, processor 202 ensures that 1. the ray bundles impinge on an area less than the full pupil area, and so their effective blur is reduced from 1.66 D by the ratio of the impinged pupil area to the full pupil area.
2. the central ray of each bundle is sharply focussed to an identical point on the retina.

In one example, the pupil diameter in a well illuminated indoor environment is around 5 mm. (This would be a common environment in which a mobile phone, laptop monitor, or desktop monitor would be used.) It is also to be noted that the threshold for noticeable blurring in such situations may be in the range 0.25-0.50 D of refractive error (at full pupil aperture). There is a natural variation from person to person in this threshold, but it is usually the case that for reading type tasks at close to intermediate viewing distance (typically 0.3-1 m), the threshold is in the upper side of this range. Furthermore, even higher refractive errors are tolerated without complaint by many presbyopes, as is demonstrated by the fact that 0.75-1.00 D additions are common initial near vision corrections for presbyopes.

The tables below show the design parameters for four examples of the design with reference to FIG. 12. The resulting equivalent full pupil blur is also calculated for each case. It is seen that for the cases listed this equivalent blur is less than 0.75 D, and in three of the cases less than 0.30 D. As described above, modification of these design parameters influence the equivalent full pupil focal error.

| d [mm] | a [mm] | Projected size of aperture at 300 mm [mm] | p [mm] | Proportion of full pupil aperture area | Equivalent full pupil focal error (for a divergent ray bundle with 1.66D focal error) |
|---|---|---|---|---|---|
| 5 | 0.025 | 1.5 | 5 | 0.09 | 0.15D |
| 2.5 | 0.025 | 3.0 | 5 | 0.36 | 0.60D |
| 3 | 0.020 | 2.0 | 5 | 0.16 | 0.27D |
| 10 | 0.035 | 1.05 | 5 | 0.044 | 0.07D |

| d [mm] | Horizontal displacement of M from Q, and M' from Q' [mm] |
|---|---|
| 5 | 0.0208 |
| 2.5 | 0.0104 |
| 3 | 0.0125 |
| 10 | 0.0416 |

It is to be noted that in each of these four embodiments the peripheral rays, such as P'Q, are inclined at too great an angle to the straight-ahead direction PN, and so will not impinge upon the front surface of the eye.

On one hand, a small value for layer separation d is desirable so that the total thickness of the two layer display is as small as possible. Such a display has the advantage of thinness and compactness. On the other hand, a higher value of d may result in a smaller projected area of a ray bundle on the surface of the eye for the same top layer aperture. This may result in lower blur. A high value of d may also result in a larger horizontal displacement between the source pixels Q, Q' and the top layer apertures M and M', thus a coarser pixel pitch (that is, lower pixel density) can be used for the source layer.

In this way it is seen that a design strikes a balance between conflicting trends in the parameters d, a and pixel pitch which will involve trade-offs between display compactness, viewer perceived blur and the display hardware resolution and cost. Depending upon the trade-offs which are considered acceptable, the design principles outlined above can be used to determine the best design parameters using well established design optimisation techniques.

Multilayer display devices exist in a variety of technologies and formats. Key parameters include the pixel and aperture pitch and size. These parameters can cover a wide range:

Pixel and aperture pitch: 0.005 mm-0.200 mm
Pixel and aperture diameter (size): 0.005 mm-0.100 mm.

All such technologies and parameter ranges can be utilised for this invention, although it is to be understood that some values may give higher quality results than others, in accord with the trends described above. Although specific parameter ranges are specified here, the principle applies equally to values which are outside these ranges; however, it is to be appreciated that values near or above the upper limits may result in reduced visual quality due to large blur, while for values near or less than the lower limits the visual quality may be adversely affected by diffractive effects.

The gap between the layers in FIGS. 11 and 12 maybe air (as assumed in this description), or another transparent material. In the latter case, corrections may be made in the above calculations to account for the change in refractive index of the interlayer material. Likewise, corrections may be made for the refractive index of the materials which constitute the source and top layers, depending upon the thickness of these layers.

FIG. 13a illustrates a situation 1300 where the right (R) eye 1302 and left (L) eye 1304 of a user converged to a point 1306 on a display 1308 that is 300 mm in front of them and has active layer 1310 and mask layer 1312.

FIG. 13b illustrates an image plane F 1350 that represents a two dimensional (ideal) image that it is desired to image at the same time on the retinas of the viewer's R and L eyes 1302 and 1304, respectively. Let Z be any point 1352 on this image plane 1350, which we will represent as a matrix of pixels indexed by i=0, . . . , $N_H$ in the horizontal direction and j=0, . . . , $N_V$ in the vertical direction. In this example, the limit of foveal vision is about 5 mm at 300 mm distance.

Processor 202 may define a $m^2$ multiplexing partition of the image plane by assigning each pixel (i,j) to a frame indexed by [mod(i,m), mod(j,m)]. This way processor 202 partitions the image plane F into $m^2$ frames indexed by [I,J] for I,J=0, . . . , m−1. FIG. 14 shows an example of a $2^2$ partition 1400. Each partition defines a subset of pixels and processor 202 stores the partition indices on data store 106 for later use as described below.

While a particular kind of frame partitioning into subsets has been disclosed here, this invention includes other partitioning techniques, where the intent is to separate points as far as possible within a frame. It is to be realised that a single frame is also covered by this invention.

Ideally, the points in each frame, when projected, do not share any source points or apertures on the source layer or the top mask layer respectively. Thus, in the context of FIG. 12, Q, P, Q' and M, N, M' are only utilised to image one retinal point in each frame. More generally, processor 202 performs the partition such that pixels within a predetermined distance, such as min_distance=2 in the above example, belong to different subsets.

The partitioning 1400 allows the source and mask layers to be optimised just for this point. In reality, such an ideal separation may not be feasible; and so the partitioning into frames minimises this sharing, paying most attention to areas which are contributing to foveal vision.

Processor 202 may calculate optimal source layer and mask layer patterns for each frame. Processor 202 then projects these frames rapidly sequentially in time. The number of frames and the duration of projection of each frame may be determined by hardware constraints on the response time of the source and mask layers, the response time of the human visual system, factors related to the persistence of visual sensation and the ability of the visual system to sum retinal images, and the capacity of the processor 202 to handle this computational task at sufficient speed. It is to be appreciated that a large number of frames, with a rapid frame refresh rate is most desirable for this purpose; however, for the reasons just outlined, a lower number of frames with a lower refresh rate will be the case for any embodiment.

It is also to be appreciated that many of the calculations that need to be done in the frame partition and the frame optimisation need only be performed once (that is, pre-calculated, and not calculated in real time), and so can be hard-coded into the processor. This will reduce the real-time computational requirements of the processor.

In one example, the pitch and size of the source pixels and the mask layer apertures, as well as the separation d between them is predetermined and therefore remains fixed during the following optimisation. In practice, this choice may be based upon the kinds of practical considerations and constraints outlined above. The objective of the design optimisation is to obtain the best visual response given these chosen display hardware parameters.

Performing this optimisation, processor 202 considers each frame independently, since through multiplexing processor 202 presents the frames to the viewer as independent images. As the output of the optimisation processor 202 determines two mappings, i(Q) and t(M), representing respectively the intensity of the pixel at Q in the source layer and the transmission of the aperture at the point M on the top mask layer.

For multiple layer displays with more than one mask layer, there may be a correspondingly greater number of transmission functions. Depending upon the hardware of the mask layer, t(M) may take binary (on-off) values or continuous values.

Two optimisation approaches will be described. The first may only be performed once (that is, pre-calculated once, the result stored on data memory 106, and not calculated in real time) as it does not depend upon the particular dynamic content of the image frame.

This has the advantage of reducing the real-time computational requirements on the processor. It may, however, not give a good result for a general image frame. The second approach relates directly to the content of a particular frame, and so processor 202 processes this frame in real time. This may place a significant computational demand on the processor 202. A desirable hybrid approach uses the first approach to generate a starting configuration (predictor) for the second approach, which can then partially "correct" this predictor in order to obtain, in general, improved image quality.

Point Image Optimisation:

The aim of this first optimisation approach is to determine the mappings i(Q) and t(M) so as to minimise the design objective function $$\sum_Z e_R^2(Z) + e_L^2(Z)$$

where the summation is over all pixels Z in the current image frame, and $e_R(Z)$, $e_L(Z)$ denote the equivalent full pupil focal error (as defined above) for the image of the point Z in the right and left eyes respectively.

In order to calculate this, the chief ray QM of each ray bundle is associated with the image point Z of the frame to which it is closest. Processor 202 may perform the calculation of $e_R(Z)$, $e_L(Z)$ in the above objective function by using ray tracing techniques based on paraxial geometric optics along the lines outlined above. Processor 202 may use a simple refractive model of the eye for this calculation. It may be sufficient to consider the eye to be uniform medium of index n=4/3 with an air-interface (representing the cornea) and an entrance pupil aperture size of 5 mm. The optical dioptric power of the interface may be taken to be 45 D, although this value is not critical in this calculation. Moreover, in performing this optimisation it is to be understood that the sum of the brightness of all ray bundles associated with Z are constrained to be a constant, this constant being the same for all Z.

It is to be noted that it may be sufficient, and computationally efficient, to pay most attention to image points Z that correspond to the image points that lie within area of acute foveal vision. This may be a region of 5 mm or so diameter centred on the straight-ahead direction of gaze for each eye. This may be implemented by using different weightings in the objective function which are dependent upon the location of Z within the image frame, where some of these weightings may be 0.

It will be appreciated that there are equivalent or closely related quantitative representations of image blur and image fidelity which could be used. The optimisation technique described here may be extended to these alternative representations The optimisation may be achieved by using non-linear least squares techniques, such as gradient descent. Moreover, in performing this optimisation processor 202 may constrain the brightness of the perceived image of Z to be a constant for all points Z.

The partitioning into frames means that there is reduced "cross-talk" between neighbouring image points Z in the same frame. However, in general, this reduction may not be sufficient to obtain an acceptable image quality. This first approach makes use of a non-specific, uniform image frame F as its target. The second approach, to be described next, uses the actual image field as its target.

Extended Image Optimisation:

The aim of this second optimisation approach is to determine the mappings i(Q) and t(M) so as to minimise the design objective function $$\sum_Z e_R^2(Z) + e_L^2(Z) + E_R^2(Z) + E_L^2(Z)$$

where the summation is over all pixels Z in the current image frame.

Here $e_R(Z)$, $e_L(Z)$ are as in the first approach, while $E_R(Z)$, $E_L(Z)$ now represent the error in brightness between the ideal image at Z and the summed brightness of all ray bundles QM that have been associated with Z. Again, processor 202 may perform this calculation of $E_R(Z)$, $E_L(Z)$ by ray tracing techniques based on paraxial geometric optics using a simple refractive model of the eye for this calculation. It may be sufficient to consider the eye to be uniform medium of index n=4/3 with an air-interface (representing the cornea) and an entrance pupil aperture size of 5 mm. The optical dioptric power of the interface may be taken to be 45 D, although this value is not critical in this calculation.

It is to be noted that it may be sufficient, and computationally efficient, to pay most attention to image points Z that correspond to the image points that lie within area of acute foveal vision. This may be a region of 5 mm or so diameter centred on the straight-ahead direction of gaze for each eye. This may be implemented by using different weightings in the objective function which are dependent upon the location of Z within the image frame, where some of these weightings may be 0.

Again, it will be appreciated that there are equivalent or closely related quantitative representations of image blur and image fidelity which could be used. The optimisation technique described here may be readily extended to these alternative representations.

Processor 202 may consider the eye to be uniform medium of index n=4/3 with an air-interface (representing the cornea) and an entrance pupil aperture size of 5 mm. The optical dioptric power of the interface may be taken to be 45 D, although this value is not critical in this calculation. It is to be appreciated that there are a number of other image fidelity criteria that can be used for this purpose, and which are either equivalent or closely related to $E_R(Z)$ and $E_L(Z)$.

Processor 202 may perform the optimisation using non-linear least squares techniques, such as gradient descent. As noted above, processor 202 may perform the optimisation in real-time, which may be computationally demanding on the processor 202. For this reason, the pre-calculated result of the first optimisation approach (after a suitable convolution with the actual ideal frame image) may be used in order to obtain a good initial configuration for the mappings i(Q) and t(M) which may then be used to start this second optimisation approach.

It is noted that the calculation of e(Z) and E(Z) may be based on the finite size of the apertures.

As the apertures restrict the amount of light reaching the eye from each aperture in order to limit the blur the brightness delivered by each aperture is reduced from what it would be without an aperture. To counteract this effect, processor 202 may determine the control signal of the active layer and the mask layer such that there are multiple apertures contributing to the imaging of a point (such as M, N and M' in FIG. 11). Processor 202 chooses the brightness of each of the source pixels Q, P, Q' such that the sum of the intensities of all the ray bundles impinging the surface of the eye results in the desired image brightness.

To a sufficient level of approximation, if B denotes the luminous intensity of a single pixel P to produce the desired brightness in the absence of any aperture mask, then with an aperture mask the luminous intensity of each of n pixels which contribute to the imaging of a single point should be $b=B/(n\times\text{proportion of full pupil area illuminated by each ray bundle})$ to produce the same brightness. Although in FIG. 11, for purposes of illustration n=3, in a two dimensional pattern, in other cases n>10 to increase the brightness.

Furthermore, if processor 202 implements multiplexing, processor 202 increases the intensity increased to account for the duty cycle. Thus if there are f frames per cycle, of equal duration, the intensity would be $b'=b\times f$.

FIG. 15 illustrates a method for compensating a visual impairment of a visually impaired user as performed by processor 202. Processor 202 determines 1502 a control signal for an active layer and a mask layer by optimising a cost function that is based on the control signal and a measure of quality of a perception of the visually impaired user. Processor 202 then applies 1504 the control signal to the active layer and the mask layer to compensate the visual impairment.

FIG. 16 illustrates an example architecture for display 212. Display 212 comprises an active layer 1602 and a mask layer 1604 both connected to processor 202 via a control signal line 1606. In this example, the active layer comprises an individual light source for each pixel, such as an LED or OLED. The mask layer 1604 may be an LCD and may be a greyscale LCD. It is noted that the number of pixels and the pitch of the layers 1602 and 1604 may be different or may be the same.

FIG. 17 illustrates a further example architecture for display 212. Similar to the example in FIG. 16, display 212 comprises a source layer 1702 and a mask layer 1604 also connected to processor 202 via control signal line 1606. The mask layer 1604 may be the same mask layer 1604 as in FIG. 16. In contrast to FIG. 16, in this example the active layer 1702 comprises a uniform backlight 1704 and an intermediate layer 1706 to control the light from the backlight for the individual pixels. The intermediate layer 1706 may be an LCD, such as a colour LCD.

Combinations of the architectures of FIGS. 16 and 17 are also possible, such as a backlight 1704 that is controllable for groups of pixels of the intermediate layer 1706 or a backlight 1704 that comprises a white LED associated with each pixel in LCD layer 1706.

FIG. 18 illustrates another example of the generic home screen 1802 as shown in FIGS. 8a and 8b. In the example of FIG. 18, the user's eye gaze direction is detected to be at the central icon 1804 of the home screen and therefore, the optimisation has applied a higher weight on the centre of the home screen 1804. As a result, the central icon 1804 is projected correctly and appears sharp while the other icons are blurry.

FIG. 19 illustrates a simplified representation of an optical system 1900 of the eye of the user. It is noted that the system 1900 is not to scale for presentation purposes. Processor 202 may perform the optimisation based on system 1900 and may use paraxial optics to reduce complexity. The system comprises display 212 including the active layer 1602 and mask layer 1604 as described with reference to FIGS. 16 and 17. The system 1900 further comprises a pupil aperture F 1902 of the user including a lens (not shown) and a retinal image plane R 1904, which is the focal plane for an object 1906 at 600 mm from the pupil aperture 1902, for example. The dioptric power of the eye may be approximately 4.5 D.

It is noted that the user looks at display 212, which is about 300 from the pupil aperture 1902 but due to the hyperopia of the user, the focus is on object 1906, which is 600 mm away, which is the reason why the display without modification appears blurred.

FIG. 19 further shows a ray bundle 1908 generated by source layer 1602 and controlled by mask layer 1604. Ray bundle 1908 comprises chief ray QM 1910. 'X' markers on image plane 1904, such as marker 1912, denote the matrix of points in the image plane of the current frame.

The lower point 1914 where ray bundle impinges on the eye surface 1902 is denoted as G while the upper point 1916 is denoted as G'.

An outline of the algorithm used by processor 202 to perform these calculations is now described.

1. For any ray bundle 1908 with central ray QM 1910, calculate the area (GG') on the front surface 1902 of the eye (considered to be a plane for our purposes, as in FIG. 19) that is impinged by the bundle 1908. This is the area of the projection of the aperture 1604 at M onto the surface of the eye 1902 at 300 mm from the mask layer 1604, as was discussed earlier in the context of FIG. 12.
2. If the chief ray QM 1910 impinges on the front surface of the eye 1902 within the pupil aperture of the eye (of diameter p), then find a point H 1918 at which the chief ray QM 1910 after refraction at the front surface of the eye 1902 will meet the retina 1904 (considered for our purposes to be a plane as in FIG. 19 that is the focal plane for objects at a distance of 600 mm). This calculation is carried out based on paraxial ray tracing.
3. Determine a point Z 1912 of the current frame that is nearest to H 1918, and assign this ray bundle QM 1910 to Z 1912.
4. Calculate the brightness of this ray bundle 1910 as $i(Q) \times t(M) \times$ area GG', where $i(Q)$ is the intensity of light emitted at the source point Q (assumed uniform) and $t(M)$ is the fraction transmitted through the aperture at M.
5. Perform the calculation 1.-4. for all ray bundles QM, where Q ranges over all points in the source plane (or all points within the limits of foveal vision, if this simplified option is considered), and M ranges over all apertures on the corresponding portion of the mask layer, where clearly only apertures for which $t(M)>0$ need be considered. In doing this,
   a. accumulate the numerical sum of the brightness of all ray bundles associated with each point Z
   b. accumulate the set-theoretic union of the areas GG' which are impinged by the projected ray bundles associated with each point Z
6. At the end of the calculation loop described in 5,
   a. E(Z) will be the sum of the brightness of all ray bundles associated with each point Z
   b. Let A(Z) be the area of the union of the areas GG' which are impinged by the projected ray bundles associated with each point Z, then $e(Z)=A(Z)/(\pi p^2)$ where p is the diameter of the pupil (which has been taken to be 5 mm in the above examples).
7. Perform the calculations 1.-7. for both the left and right eyes for the current directions of gaze and binocular convergence. (See FIG. 6) This will give $e_R(Z)$, $e_L(Z)$, $E_R(Z)$ and $E_L(Z)$.

The cost function as stored on program memory 104 is then $$\sum_Z e_R^2(Z) + e_L^2(Z) + E_R^2(Z) + E_L^2(Z)$$

that is parameterised by the intensity of light emitted at the source point Q $i(Q)$ and the fraction transmitted through the aperture at M $t(M)$. This way, by optimising the cost function, processor 202 can find $i(Q)$ and $t(M)$ for each pixel of the active layer 1602 and each aperture of the mask layer 1604 in order to minimise the cost function. The optimisation problem may be simplified by limiting the variables $i(Q)$ and $t(M)$ to binary variables, such that the pixels are either on or off and the apertures are either open or shut, which would result in a black and white image or a fully saturated RGB image.

In one example, the separation between active layer 1602 and mask layer 1604 is 1 mm. In that example, the discrete angle step is 5 degrees (=arctan((25.4/300)/1), where 25.4=mm/inch, 300=dpi and 1=spacing in mm). In another example, processor 202 can step the chief ray direction in steps of about 0.25 degrees, with 300 dpi and a 20 mm separation between layers. In one example, the mask layer has a pitch of 0.020 mm corresponding to about 1250 dpi.

At such high resolutions processor 202 may group the apertures in 4×4 blocks, where each of these 16 apertures within the block are the same (open or closed in the binary case). Thus this relates to a 300 dpi resolution as far as the optimisation degrees of freedom is concerned, although with some offsets to be included as optimisation variables (although processor 202 can predict these beforehand).

The complexity of the optimisation, that is, the number of optimisation variables may be reduces by the following measures.

1. The result of optimising the cost function for the single point case may be stored on data memory 206. Processor 202 can access these values as starting points, which may significantly increase convergence and accelerate the computation.

2. Processor 202 may focus the calculations to the region of "foveal vision", which is dominant in acute vision. This may correspond to a region of around 5 mm×5 mm when viewing a display at 300 mm. Assuming a pixel and aperture pitch of 12/mm (300 dpi), this gives potentially 7200 optimisation variables (for 2 layers) which are dominant at any one time (that is, for any particular direction of gaze). Outside this region of foveal vision, considerable blur may be tolerated, and so a non-optimal solution is acceptable. As the direction of gaze changes, processor 202 changes this region of foveal vision.

3. The first optimisation approach outlined is precalculated and stored on data memory 206, and so can be done off-line, and not by the device's processor 202 in real time.

4. Processor 202 may limit accuracy of the optimisation calculations to some level of approximation. For example, processor 202 iteratively finds better solution until the change between an old solution and a new solution is below a predefined threshold. In that example, the predefined threshold may be relatively high. In other examples, the optimisation can simply be stopped after a certain time based on the frame rate of the display.

In some situations, the eye gaze of the user remains relatively unchanged, such as when the user looks at a particular point on the screen, such as icon 1804 in FIG. 18. During these situations, processor 202 can store the optimisation result on data memory 206 and retrieve the result as a starting value of a later optimisation. This means that even if the computational power of processor 202 is insufficient for real-time calculations, the display becomes clearer to the user over time, such within two seconds, which is still useful in many situations.

The approach disclosed herein is different to other approaches, in that, rather than trying to compensate after the event for the blurring resulting with the viewer's refractive error by complex image pre-processing, instead the current approach seeks to reduce the effects of the blur at the source of that blur by the selective partial occlusion of the blur spot, making use of a mask layer just above the source of illumination.

The following description provides a further example that may be used in combination or as an alternative to the examples above. In other words, some features described below may be taken individually to replace corresponding features described above or to complement methods described above. For example, an optimisation procedure below may be used to optimise a cost function described above.

The example below may comprise the following features:
1. It is relatively simple computationally, with many of the necessary calculations able to be performed beforehand and the results stored internally within the device as data or as programmed processor instructions. Importantly, unlike other image-processing approaches, the technique does not rely on any knowledge of the specific image content of each frame. With an appropriate processor all calculations should be able to be performed in real time.
2. The approach takes account of the basic optical and motor behaviour of the human visual system, in particular the critical importance of the foveal region for visual acuity, the movements of the eye that give a viewer the perception of an extended visual field, and the likely binocular convergence profile of a presbyopic viewer.
3. Use of eye tracking hardware and software to accurately track in real time the directions of gaze of the viewer's two eyes, the viewer's binocular state and pupil size. This is used to dynamically update the image that is displayed on the device by changing the state of the various pixels in a multilayer display.
4. It uses multiple partial images, each representing a part of the desired total image. These partial images are presented to the user in quick succession in an interlaced manner. If this is done with the appropriate timing, then the persistence of vision and the flicker response of the human visual system will result in the viewer's perception of a single image.

The approach can be used in a stand alone setting, or together with a simplified form of an inversion optimisation approach to potentially further improve performance.

Consider the configuration that is depicted in FIG. 20, which shows a simple reduced optical model 2000 of the eye with a single refracting surface 2002, a retina surface 2004 and a conjugate plane 2006. Paraxial optics may be used throughout this description. The specific case represented in the figure has

- a corneal surface with a spherical dioptric power of 61.666 D;
- an axial cornea-retina distance $P_0Q_0$ of 22.222 mm;
- an internal refractive index of n'=4/3;
- a pupil that is in the plane of the cornea.

For the example parameter values depicted in the figure, this eye will exactly focus objects at 600 mm onto the retina 2004. This is intended to represent the near focal point of a presbyopic user who requires no distance correction but is only able to a comfortably accommodate by +1.66 D Sph in their near vision. Typically, a smartphone or tablet display will be viewed at a closer distance than 600 mm and will result in a blurred image. In many situations a computer display might also be viewed at closer distances than this.

As paraxial optics is assumed in this example, the corneal surface 2002 and retinal surface 2004 are shown approximately as planes in FIG. 20, corresponding to the tangent plane to the cornea at the centre $P_0$ of the cornea and pupil and the tangent plane to the retina at $Q_0$. The direction 2008 defined by $Q_0P_0$ is the optical axis of the eye, and the direction of gaze (or fixation) of the eye. The point $Q_0'$ is 600 mm along this direction 2008, and the horizontal dashed line 2006 through $Q_0'$ represents the plane conjugate to the retina.

All points on the conjugate plane 2006 are focussed perfectly on the retina 2004; in particular Q' is focussed at Q on the retina where $$\frac{Q'Q_0'}{QQ_0} = -n'\frac{P_0Q_0'}{P_0Q_0} = -36$$

where the negative sign indicates image inversion, as shown in FIG. 20.

Thus, in this simple model, to find the image formed by any ray, the direction of the ray is extended to find the point P of intersection with the cornea 2002. If this point is within the open pupil, the ray is extended in the reverse direction to find the point Q' of intersection with the conjugate plane 2006. This point is then mapped onto the retina proper 2004 by the above simple scaling to give the retinal image point Q. (Note that this extension does not correspond to an actual ray. It is just a geometrical construction to assist with the calculation of the retinal image point.) If P is outside the retina, then there will be no image.

The pupil diameter of the eye changes dynamically, primarily in response to the level of illumination that enters it. In one example, the value for the pupil diameter is $\rho=5$ mm, which would be typical for moderately illuminated interior situations. Note that $\rho$ can vary between individuals, other factors being equal. As stated previously, the description to be given here can be readily modified for other pupil diameters.

The part of the human retina that is responsible for visual acuity, that is, the ability to distinguish fine detail, is quite small. The region of maximum acute vision (foveola) is typically 350 µm in diameter, corresponding to about 1.25° of visual field, or 7 mm at 300 mm. Outside this region, acuity falls off rapidly, and blur is largely unnoticed. Our perception of a wider visual field comes about by constant eye movements moving the image of different parts of the visual field over the fovea. In this description of the invention we will assume that the fovea is a circular region of 400×400 µm centred on $Q_0$. This corresponds to a circle of side of approximately 15 mm in the conjugate plane.

Multilayer Display

FIGS. 21a and 21b show a two layer visual display. It consists of a source layer 2102 which is a regular array of pixels which emit light. These pixels may be sources of light in their own right, such as in an LED display, alternatively they may be controlled transmissions elements which transmit a controlled amount of light from another source of illumination which lies behind this source layer, as in an LCD display with a backlight. More generally, they are a regular array of pixels which can be individually controlled in order to emit light over a range of intensity. Furthermore, each of these pixels may have a small number of sub-pixels, again each individually controllable. For example, these subpixels may emit light of different colours and be arranged in a some RGB three colour pattern within the pixel.

Above the source layer 2102 is a mask layer 2104 consisting of a regular array of controlled apertures. Each aperture is either closed, in which case it blocks the passage of all light through it, or it is open, in which it transmits all, or a substantial fraction, of all light that falls on it from behind. Each of these apertures is individually controllable and can be switched between the open and closed state. Again, an LCD panel is a particular instance of this kind of mask layer.

The source layer 2102 and the mask layer 2104 with aligned pixel and aperture arrays are arranged with the mask layer 2104 at a fixed distance $t_0$ in front of the source layer 2104 (in the direction of source light travel).

In FIGS. 21a and 21b, the apertures are depicted as collectively completely covering the mask layer 2104, and the source pixels are placed under every fourth mask aperture. The source pixels are depicted as being the same size as the apertures. Also, FIGS. 21a and 21b only represent a one dimensional view, with a variety of possible two-dimensional representations of the source pixels, for example as circles, or squares. It may be assumed that the source pixels and the mask apertures are circles.

In one example the inter-layer distance $t_0=5$ mm and the aperture diameter $\delta=20$ µm. Pixels of this size and smaller are currently used in some very high resolution displays in smartphones.

To assist with the understanding of the description it may be helpful to further consider the geometrical pattern of light transmitted through the mask layer 2104. As depicted in FIG. 21a, the pattern of light can be quite complex. It will depend upon the shape and structure of the source pixel, for example how the RGB sub-pixels are arranged; how the luminance of the source pixel varies across its diameter; shape and structure of the mask aperture, and how its transmittance might vary across its diameter. Moreover, diffraction effects may also be present.

For simplified calculations, processor 202 may perform the calculations based on a simple transmission pattern as depicted in FIG. 21b, which shows the source pixel represented as a point source with isotropic luminance through the pupil formed by the aperture. As an estimate, this pattern would lead to a blur spot of radius 16 µm on the retina.

For further simplification for clarity of presentation, this description will sometimes just refer to the chief ray from the centre of the pixel through the centre of an aperture. When using this simplified chief ray description, it is noted that there is also a diverging bundle of rays surrounding this chief ray as it travels out from the mask layer.

It is also convenient to introduce the concept of the offset n between a source pixel and a mask aperture. This counts the number of apertures steps from the aperture immediately above a specific source pixel to a specific mask aperture. It is illustrated in FIG. 21b.

As illustrated in FIG. 21b, the offset is an integer. However, in some instances of this invention there may be fractional offsets, for example an offset of 1.5. Although each aperture is a single controlled transmission element, in some instances such an aperture may have sub-apertures which can be individually controlled. For example, a square aperture may consist of a 2×2 array of square sub-apertures as shown in FIGS. 22a and 22b. In the figures, if the full size apertures have the offsets as indicated, then a shifted grouping of the sub-apertures, will effectively be a full-size aperture with a half step offset.

Monocular Straight Ahead Viewing and the Multiple Partial Image Approach

The following example concerns the case of monocular viewing of the multilayer display described above, with a direction of gaze normal to the plane of the display. Recalling that the example user is a presbyope with a near point of 600 mm, FIG. 23 shows the display 2302 placed at a distance of 300 mm from eye 2304. This is a desirable reading distance, and for this user would correspond to a 1.66 D refractive error. If viewed without a mask layer, or with a mask layer that was completely open, a point source pixel would lead to a blur spot on the fovea of such a viewer of an approximate radius of 70 µm, which would limit the user's ability to use the display in many situations. (This corresponds to the pupil projected onto the plane conjugate to the retina through Q in FIG. 23.)

For a multilayer display 2302 of the kind described in the previous section it is the case that for a given configuration of the eye relative to the multilayer display:

1. For each source pixel there is only a limited number of apertures such that light from that source pixel passing through that aperture will also pass through the pupil. This can be conveniently described in an approximate way by the set of aperture offsets relative to a pixel such that the chief ray through that pixel and the offset aperture passes through the pupil. These apertures will be referred to as the feasible apertures for that source pixel (and given eye configuration).
2. There is no overlap between the set of feasible apertures for different source pixels; or more generally, there are relatively few overlaps, and these exceptions
    can be handled by an optimisation technique (which will be discussed later); or
    will have no effect on the construction that will be explained soon; or will be neglected in the construction that will be described, accepting that this neglect may reduce the performance.

FIGS. 24 and 25 depict two arrangements of mask apertures which taken together in an interlaced fashion is able to present any desired image content onto the fovea. To explain this, consider first FIG. 24. This shows in parallel the intersection of various light rays with the pupil and the source layer, and the constructed extension of that ray back to the plane conjugate to the retina.

Any source pixel between $S_0$ and $S_1$ on a source plane 2402 and its corresponding mask aperture with offset n=0 will be mapped onto a plane 2404 conjugate to the retina, through the outer part of the pupil 2406, by a vertical line in the figure to produce the heavy dark line $R_0$. In this case, the points $S_0$ and $S_1$ are a distance 1.2 mm and 2.4 mm from the optical axis respectively; and the region $R_0$ extends from 1.2 mm to 2.4 mm from the optical axis.

Likewise, any source pixel between $S_1$ and $S_2$ on the source plane and its corresponding mask aperture with offset n=1 will be mapped onto the plane conjugate to the retina, through the outer part of the pupil, by a slanted line in the figure to produce the heavy dark line $R_1$. In this case, the points $S_1$ and $S_2$ are a distance 2.4 mm and 3.6 mm from the optical axis respectively; and the region $R_1$ extends from 3.6 mm to 4.8 mm from the optical axis.

The occurrence in this construction of the distance 1.2 mm, and multiples and spacings thereof, is a result of the calculation $$\text{viewing distance} \times \frac{\delta}{t_0} = 300 \, \text{mm} \times \frac{0.020 \, \text{mm}}{5 \, \text{mm}} = 1.2 \, \text{mm}.$$

This process can be continued progressing outward from the optical axis along the source plane, using higher values for the offsets, as shown in FIG. 24.

Although described here in a one dimensional setting, this construction can be applied in any radial direction, after making slight adjustments needed for fitting a square grid array of pixels and apertures into a radial based construction. For any radial direction, which is not a horizontal or vertical direction, a radial integer offset $n_{radial}$ will not in general correspond exactly to an integer offset ($n_{horizontal}$, $n_{vertical}$) in the rectangular grid of apertures. In this case, processor 202 chooses the rectangular aperture offset so that it is as close as possible to the ideal radial offset location. It is to be appreciated that this may lead to some loss of performance; however, if fractional rectangular aperture offsets can be used, this loss of performance will be reduced.

In this way a series of circular bands, or near circular bands, is obtained on the conjugate plane, which correspond to images of the source plane. These circular bands extend out to the foveal limit and beyond. However, clearly, there are gaps in this. Looking next at FIG. 25, a similar construction, using another part of the pupil, is able to fill in these gaps.

Taken together, these two constructions permit any image to be formed on the conjugate plane by performing two stages. This may be achieved by presenting these partial images to the user in quick succession in an interlaced manner. If this is done with the appropriate timing, then the persistence of vision and the flicker response of the human visual system will result in the viewer's perception of a single image.

It is to be noted that the particular construction just described is not the only one that can achieve this objective. For example, FIGS. 26 and 27 use the same underlying concept to describe another pattern of apertures to achieve a similar result. There will be many similar constructions, based on the same principle of selectively using different parts of the pupil aperture and mask layer aperture offsets to produce a collection of partial, interlaced images which fill out the visually relevant regions of the plane conjugate to the retina. These partial images can then be displayed in rapid succession so that the viewer perceives a single image. Although the example given here is one for which two partial images suffice to produce a total image, a greater number of partial images, three or four for example, may also be used.

In differing situations, some constructions may prove superior to others in optical performance and sensitivity to uncertainties and inaccuracies (for example, in pupil size and eye position relative to the display, and in pixel and aperture shape and alignment).

Oblique monocular direction of gaze and eyetracking technology.

Consider next the case of a monocular oblique direction of gaze as depicted in FIG. 28. Typically, the angle of obliquity $\alpha$ will be small, $\alpha \leq 10°$. In this case, the most significant effect is that the offset n in the above constructions now is calculated relative to the offset $n_0$ corresponding to direction of gaze as shown in FIG. 29, $$n_0 = \frac{t_0 \tan \alpha}{\delta}.$$

That is, n=0, 1, 2, 3, . . . in the constructions in FIGS. 24, 25, 26 and 27 is replaced by $n_0$, $n_0$+1, $n_0$+2, $n_0$+3, . . . .

It can be seen from the description just given that accurate knowledge of the eye's direction of gaze, fixation point on the source plane and centre of pupil location and pupil size is useful for the operation. These may be, of course, dynamically changing as a user looks at the content of a display device.

Face tracking is provided by modern smartphones and similar devices. Processor 202 uses the phone's internal camera and internal image processing software to determine the position and orientation of the user's face dynamically in real time. Processor 202 uses this information for various control functions such as display power management and scrolling. More advanced eye-tracking technology is also available, again using cameras and image processing software.

Binocular eye tracking technology can accurately determine in real time
  1. the direction of gaze;
  2. the fixation point of the eye on a extended object that is being viewed;
  3. the location of the centre of the pupil
  4. the pupil size for each eye. Processor 202 makes use of these results from this eye tracking technology to determine the parameters needed for the calculations described above.

Binocular Vision

In near vision the directions of gaze of the two eyes of a user will usually converge on a common point, the near convergence point. Since there is an observed close correlation between convergence and accommodation in near vision, thought to arise from an accommodative stimulus for convergence, the near convergence point is usually close to the near focal point. Such accommodative convergence is involuntary, with a user being unaware of it. Although voluntary convergence may be possible for some users, it usually requires considerable concentration, and so is likely to be tiring, unnatural and uncomfortable.

FIG. 30 shows the directions of gaze for the left and right eyes of a presbyopic user viewing a mask plane 3002 that lies closer than their near focal point 3004. PD 3006 denotes the interpupillary distance, the distance between the centre of the pupils of the right and left eyes. In most adults, this lies in the approximate range of 60-70 mm. For such a presbyopic user, who has reduced accommodative range, their comfortable near convergence point is likely to be close to their near focal point, which is behind the mask plane 3002 and source plane 3008. Thus, in the figure, the directions of gaze of the two eyes will meet the mask plane at different points, denoted by $Q_r$ and $Q_l$. Although the gaze of the left and right eyes will fixate on different parts of the display, a user with normal binocular fusional capacity will perceive a single binocularly fused image with a lateral location close to the lateral location of the near convergence point.

It is known that the nexus between accommodation and convergence is not perfect. Apart from accommodative convergence, the convergence of the eyes can also be involuntarily influenced by the user's mental awareness of the nearness of the object being viewed, so-called proximal convergence. In the case presented in the figure, this would likely move the near convergence point closer to the mask and source planes from the near focal point. On the other hand, there is also evidence for an involuntary fusional component to convergence; that is, the directions of gaze of the eyes will change so that the two eyes are presented with consistent retinal images that the mind is able to fuse into a single visual perception. An example of fusional and accommodative convergence overcoming proximal convergence is given by looking at one's face in a mirror held at 300 mm. For the specific presbyope considered in this description, they would comfortably and clearly see the image of their face in the mirror, as it is optically located at 600 mm. The binocular convergence state would be as in the figure.

In the light of the above considerations, the calculations performed by processor 202 may be based on the assumption that the (comfortable) near convergence point coincides with the near focal point.

Since the points $Q_r$ and $Q_l$ are sufficiently far apart, it is possible to control what the right and left eyes see independently of each other by controlling the source and mask patterns around $Q_r$ and $Q_l$ respectively. Processor 202 calculates the locations of $Q_r$ and $Q_l$ accordingly, and determines the source and mask patterns around $Q_r$ and $Q_l$ independently of each other using the method described above for monocular vision.

Alternatively, a different convergence pattern to the above may be stored on data store 206 associated with a particular user for who this pattern is comfortable in near vision. Processor 202 can incorporate this pattern by shifting the points $Q_r$ and $Q_l$ accordingly, as long as they remain sufficiently far apart as to permit independent choice of the mask and source patterns for $Q_r$ and $Q_l$.

The data stored on data store 206 indicative of the convergence pattern may arise from a previous clinical examination of a user who has a convergence deficiency or excess (phoria), or it could be determined through analysis of data obtained by the eye tracking capability that is described above. This can be done either once during a set up and calibration stage, or dynamically during use.

For the specific case considered in this description, the mask and source planes are approximately 300 mm from the plane of the pupils, and the near focus point is a further 300 mm away. For a PD distance of 65 mm, this would mean that the distance $Q_rQ_l$ is approximately 32.5 mm. Recall that in this case the radius of the regions on the source and mask planes that is imaged monocularly on the foveal region of each eye is approximately 4 mm, or 8 mm allowing for some extra-foveal reserve. Thus there is no overlap between the right and left eyes in this case, and the left and right eyes can be treated independently.

Additional Optimisation

As mentioned earlier, some of the assumptions behind the general style of construction described above that relate to the non-overlap of the sets of feasible apertures may not always hold. If this assumption does not hold, then it may lead to a case when one source pixel is imaged on to two spatially distinct points on the conjugate plane by chief rays that pass through different apertures. On the one hand, this situation may be tolerated, in which case the above construction is carried out regardless, which will result in some degradation of performance. On the other hand, if this situation occurs, it may be handled by an additional computational optimisation procedure which seeks to minimise it effects. In this sense, processor 202 minimises the overlap of the projection of one subset with the projection of any other subset on the conjugate plane. This minimisation may comprise constructing the control signal with the assumption that the construction technique will lead to minimal or no overlap or may comprise iteratively optimising the control signals to eventually arrive at a minimum overlap.

Correction for Multiple Source Pixels

Let $\xi_k$, k=1, ..., N be a set of points on the conjugate plane to the retina. Typically, the set of $\xi_k$ will be a rectangular array of points, with each $\xi_k$ corresponding to a single retinal photoreceptor, or maybe the centre of small number of adjacent photoreceptors.

As indicated previously, most processing power can be directed at those photoreceptors that are in the foveal and near foveal regions. Let $I_k$ be the illumination over some small region around $\xi_k$. We may write $$I_k = \sum_i \alpha_i \sum_{s,m} B_{ksm} x_s^{(i)} t_m^{(i)} \quad (1)$$

In this expression the sum over i corresponds a sum over the partial image frames each of which is displayed for a portion of time $\alpha_i \geq 0$, where $\Sigma_i \alpha_i = 1$. The sums over s, m are sums over the source and mask aperture points respectively; $x_s^{(i)}$ is the luminous intensity of the source pixel s; and $t_m^{(i)}$ is the transmission coefficient of the aperture m.

In effect, $x_s^{(i)}$ represents a control signal to control the source layer and processor 202 determines $x_s^{(i)}$, that is the control signal, by solving the optimisation provided here. After processor 202 determines the control signal $x_s^{(i)}$, processor 202 may store the control signal in the form of an image file or frame buffer or video RAM content to display an image corresponding to the values of the determined $x_s^{(i)}$ on the source layer.

Further, the effect of the coefficient $B_{ksm}$ and $t_m^{(i)}$ is that of a control signal of the mask layer. That is, processor 202 performs the optimisation provided here to determine the control signals $B_{ksm}$ and $t_m^{(i)}$ for the mask layer. In that respect, the mask layer can be considered as a second display, which is monochrome and controlled by the control signals $B_{ksm}$ and $t_m^{(i)}$. In other words, processor 202 determines control signals $B_{ksm}$ and $t_m^{(i)}$ and stores them as an image file or frame buffer or video RAM content to display an image corresponding to the values of the determined $B_{ksm}$ and $t_m^{(i)}$ on the mask layer.

Processor 202 may calculate the coefficient $B_{ksm}$ by using paraxial optical constructions and calculations as described above, possibly after making some computationally convenient approximation for the diverging bundle of rays that surround each chief ray and for any diffraction effects (as discussed above).

In particular, the $B_{ksm}$ may depend upon
1. the shape and luminance pattern of the source pixel at s (or some convenient approximation to this)
2. which of the apertures m provide a light path from the source pixel s through the pupil of the eye to the small region around the point k.
3. size and shape of the mask aperture (or some convenient approximation to this.)
4. the relative orientations of the source pixel s, the mask aperture m and the pupil aperture of the eye (or some convenient approximation to these.)
5. the size of the pupil aperture of the eye Note that, $I_k$, $x_s^{(i)}$ and $t_m^{(i)}$ may each have three components, corresponding to the three R, G and B colours.

Let $I_k^*$ denote a desired target illumination at the point $\xi_k$. The top-level optimisation problem can be formulated as finding values for $0 \le x_s^{(i)} \le S$ and $0 \le t_m^{(i)} \le 1$ which lead to a minimum, or an approximate minimum, of $$\sum_k |I_k^* - I_k|^2,$$

or a minimum of some mathematically equivalent or similar quantity which represents the visual image difference between the target image and the actual image (visual error). Here S is the maximum luminous intensity of any source pixel.

The solution to this problem may be computationally intensive. In some circumstances where users are price sensitive and therefore, less costly low end processors are used, it may not be feasible to perform the necessary calculations in real time on these processors. This particularly applies for dynamically changing images. Of course, energy consumption may also be an issue, which means that a desired battery lifetime does not allow constant complex computations. For these scenarios processor 202 may employ the following simplifications.

1. A predetermined choice may be made for the transmission coefficients $t_m^{(i)}$ for each partial image frame i, where either $t_m^{(i)}=0$ or $t_m^{(i)}=1$.
2. Corresponding to this predetermined choice, there may be a predetermined number of partial image frames and corresponding time fractions $\alpha_i$.
3. All, or nearly all, of the points $I_k$ may be in only one of the partial image frames.

This would correspond to a complete, or an almost complete, interlacing of the partial images.

It is noted that the description above under "Monocular straight ahead viewing and the multiple partial image approach," and with reference to FIGS. 24 and 25, may be seen as a particular instance of the simplifications described in items 1-3 above.

With these simplifications, equation (1) can be written $$I_k = \sum_i \alpha_i \sum_{s \in S(i,k)} B_{ks}^{(i)} x_s^{(i)} \qquad (2)$$

where $S(i,k)$ is the set of all source points s for which $B_{ksm} t_m^{(i)} \ne 0$ for some mask aperture m; in which case, $$B_{ks}^{(i)} = \sum_m B_{ksm} t_m^{(i)}.$$

In the equation (2) above it can be seen that the cost function is based on the control signal $B_{ks}^{(i)} x_s^{(i)}$, which means processor 202 finds the optimal control signal to minimise the cost function. In another example, processor 202 maximises the inverse or the negative of the cost function, which should be seen as an equivalent optimisation to minimising the cost function.

In some examples the set of k for which $S(i,k)$ contains more than one source pixel s is not large, and moreover, when $S(i,k)$ does contain more than one source point, the number of such source points is small, such as no more than two or three. Additionally, if $S(i,k)$ does contain more than one source point, then a further approximation that could be made would be to disregard the source points s which contribute least to the sum (2) as determined by the relative sizes of the $B_{ks}^{(i)}$. Note that usually $I_k$ and $x_s^{(i)}$ have three components corresponding to the three R, G and B colours.

The following description considers the points $\xi_k$ on the conjugate plane for which $S(i,k)$ contains more than one source pixel. Let $I_k^*$ denote the desired brightness for these points. Consider the least squares optimisation problem of finding $x_s$ which minimises $$\sum_k |I_k^* - I_k|^2 \qquad (104)$$

subject to the constraint $0 \le x_s \le S$. Alternatively, some other closely related measure of the visual error that can be expressed in terms of $I_k$, or some other quantity similar to it, may be used. Note that if there is complete interlacing of the partial frames, then the optimisation problem for each partial image frame is independent.

As formulated here, this is a constrained least squares optimisation problem, and as such there are a variety of computational techniques to solve this problem. However, this may still lead in some cases to a large computational problem particularly recognising that 1. there are in fact three (independent) optimisations to be carried out, one for each of the three colour components R, G, B associated with each pixel spatial location.
2. the calculations may be carried out in real time for a target image that is potentially changing in time
3. the calculations may be carried out in real time for a changing direction of gaze of the viewer.

Therefore, for computational feasibility or for cost saving in terms of processor model and battery size, processor 202 may employ some further approximations. In this invention the following approximation technique may be employed:
1. Least squares problems of this kind lead to a set of linear equations, often called the normal equations. The approximation step starts by finding the singular value decomposition of the matrix which describes these normal equations. Note that this may still be a computationally intensive step. However processor 202 may perform this step only once for a particular direction of gaze (or for a set of similar directions of gaze). Further, this step is independent of the target image, and may be performed off-line and the results stored on the mobile device for subsequent use. In subsequent use processor 202 computes only inner products between the singular vectors and the target image in real time. These are relatively efficient to calculate. In other words, processor 202 determines the eye gaze of the user and performs a look-up on data store 206 to determine which mask layer apertures are open for this eye gaze. This also means that determining the control signals comprises computing only the source pixel intensities as they are dependent on the current image.
2. To make this singular value decomposition approach more efficient on a mobile device, processor 202 may use only a small number of the singular vectors (typically 10-100 with the largest singular values) for subsequent calculations. Furthermore, processor 202 may reduce these singular vectors in size by disregarding components that are small. Typically, each such reduced singular vector will have less than 100 non-zero components. However, the number of retained singular vectors, and the number of non-zeros in the modified singular vectors can be adjusted from what has been described here to suit the computational, memory and storage capabilities of the device and processor that is being used. It is to be understood that the use of a small number of singular vectors and the neglect of a larger number of non-zero components of these singular vectors may degrade the quality of the image that is formed on the retina.
3. A further approximation that may be introduced in order to lessen computational intensity is to relax the inequality constraints on the $x_s$ within the approximate optimisation itself, but then impose them a-posteriori to the unconstrained approximate optimal solution so obtained.

An alternative approximation procedure which may be employed either in conjunction with or separately to those just described entails finding a reduced dimensional representation of the sum that appears in (2). This can be done, for instance, by considering the most important singular vectors of the matrix associated with $B_{ks}^{(i)}$. Again this may be performed off line, and it can be done only once with the results then being stored on data store 206 of the mobile device for subsequent real time processing. Although this reduces the dimension of the problem, it may still constitute a computationally intensive calculation. Processor 202 on mobile or other display devices may also use some, or all, of the approximation techniques described above in order for these calculations to be efficient.

It is to be realised that, depending upon the processor capability, some of the above approximation steps can be applied in an iterative manner (iterative correction). That is, there is an initial straightforward application of the approximation step, followed by some estimation of the remaining deviation from the ideal optimal solution. The approximation step can then be applied to this estimated deviation in order to try to correct it. In theory, this process can be continued indefinitely. However, the practical constraints of processor capability and the need for real time processing may limit this to a moderate number.

In one example, the original image to be displayed on the mobile device is independent of the user interaction. For example, a video is generally played without user interaction. In these cases, a different computing device, such as a video server or personal computer that has a greater computing power may pre-process the video data before it is downloaded onto the mobile device. As a result, a new video format is proposed that contains the information that is used to accurately interlace the different frames with minimal computational input from the mobile processor. With such a video file, the user can watch the video without wearing their glasses. In one example, the video file is prepared under the assumption of a specific eye gaze direction, such as a straight ahead eye gaze direction.

It is noted that the modification of the graphical user interface to compensate for a visual impairment of the user by replicating an optical effect of one or more optical lenses may be activated by the mobile device automatically or by default without receiving a request for modifying the graphical user interface to compensate for a visual impairment of the user.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:
1. An electronic device, the electronic device comprising:
a display to display a graphical user interface to a user;
wherein the display comprises a source layer including multiple active light sources, each light source configured to produce a plurality of rays, each ray associated with an angle and one or more mask layers including multiple transmission control elements;
an input port to receive a request for modifying the graphical user interface to compensate for a visual impairment of the user; and a processor to modify the graphical user interface to compensate for a visual impairment of the user by replicating an optical effect of one or more optical lenses by determining a control signal to control the source layer and the one or more mask layers to direct certain of the plurality of rays from each of the multiple active light sources of the source layer at respective angles to compensate for the visual impairment, and wherein controlling the source layer and the one or more mask layers comprises generating at least two of the plurality of rays, from at least two respective active light sources included in the source layer and that, when viewed by the user, are focused sharply by the user's eye onto a single retinal point to thereby replicate the optical effect of one or more optical lenses, and wherein determining the control signal comprises determining the control signal for each of multiple subsets of pixels of the interface, and pixels within a predetermined distance belong to different subsets, such that partial images are presented in succession so that the user perceives a single image.

2. The device of claim 1, wherein the optical effect of one or more optical lenses is the optical effect of one or more prescription lenses.

3. The device of claim 1, wherein the processor is to generate a display to allow the user to select one or more of multiple candidate optical lenses and the optical effect is the optical effect of the selected one or more candidate optical lenses.

4. The device of claim 1, wherein the processor is to generate a display allowing the user to provide user credentials to access a user account associated with the user and associated with the one or more optical lenses.

5. The device of claim 1, wherein the processor is to execute one or more functions of an operating system installed on the electronic device to modify the graphical user interface.

6. A method for displaying a graphical user interface on a display to a user, the method comprising:
receiving a request for modifying the graphical user interface to compensate for a visual impairment of the user; and
modifying the graphical user interface to compensate for a visual impairment of the user by replicating an optical effect of one or more optical lenses;
wherein modifying the graphical user interface comprises determining a control signal to control a source layer of the display and one or more mask layers of the display to direct certain of a plurality of rays from each of multiple active light sources of the source layer at respective angles to compensate for the visual impairment, and wherein controlling the source layer and the one or more mask layers comprises generating at least two of the plurality of rays, from at least two respective active light sources included in the source layer and that, when viewed by the user, are focused sharply by the user's eye onto a single retinal point to thereby replicate the optical effect of one or more optical lenses, and wherein determining the control signal comprises determining the control signal for each of multiple subsets of pixels of the interface, and pixels within a predetermined distance belong to different subsets, such that partial images are presented in succession so that the user perceives a single image.

7. The method of claim 6, further comprising receiving sensor data indicative of an eye measurement of the user, wherein determining the control signal comprises determining the control signal to replicate the optical effect of one or more optical lenses in relation to an area of the display identified by the eye measurement.

8. The method of claim 6, wherein determining the control signal comprises optimising a cost function that is based on the control signal.

9. The method of claim 8, wherein the cost function is representative of an amount of blurring perceived by the user.

10. The method of claim 8, wherein the cost function is based on a pupil focal error.

11. The method of claim 8, wherein optimising the cost function comprises receiving pre-computed data associated with the eye gaze direction of the user.

12. The method of claim 11, wherein
optimising the cost function comprises solving a linear problem, and
receiving pre-computed data associated with the eye gaze direction of the user comprises receiving data indicative of a singular value decomposition of the linear problem for the eye gaze direction of the user.

13. The method of claim 6, wherein pixels of the source layer and the mask layer within a predetermined pattern belong to the same subset.

14. The method of claim 13, wherein determining the control signal comprises optimising a cost function that is based on the predetermined pattern.

15. The method of claim 6, wherein determining the control signal comprises:
determining a projection of source pixels on to a conjugate plane to the retina; and
minimising an overlap of the projection of one subset with the projection of any other subset on the conjugate plane.

16. A non-transitory computer readable medium that has an executable program stored thereon that when executed causes a computer to perform the method of claim 6.

17. The non-transitory computer readable medium of claim 16, wherein the executable program is integrated into an operating system installed on the computer.

* * * * *